(12) United States Patent
Pi et al.

(10) Patent No.: US 9,143,211 B2
(45) Date of Patent: Sep. 22, 2015

(54) MULTIPLE ANTENNA TRANSMISSION WITH PER-ANTENNA POWER CONSTRAINTS

(75) Inventors: Zhouyue Pi, Allen, TX (US); Omar El Ayach, Austin, TX (US); Sridhar Rajagopal, Plano, TX (US); Shadi Abu-Surra, Richardson, TX (US)

(73) Assignee: SAMSUNG ELECTRONICS CO., LTD., Suwon-Si (KR)

( * ) Notice: Subject to any disclaimer, the term of this patent is extended or adjusted under 35 U.S.C. 154(b) by 25 days.

(21) Appl. No.: 13/595,811

(22) Filed: Aug. 27, 2012

(65) Prior Publication Data

US 2013/0051486 A1 Feb. 28, 2013

Related U.S. Application Data

(60) Provisional application No. 61/529,575, filed on Aug. 31, 2011, provisional application No. 61/531,469, filed on Sep. 6, 2011, provisional application No. 61/533,644, filed on Sep. 12, 2011, provisional application No. 61/540,284, filed on Sep. 28, 2011.

(51) Int. Cl.
*H04B 7/02* (2006.01)
*H04B 7/04* (2006.01)
*H04B 7/06* (2006.01)
(Continued)

(52) U.S. Cl.
CPC ............... *H04B 7/0465* (2013.01); *H04B 7/02* (2013.01); *H04B 7/043* (2013.01); *H04B 7/0426* (2013.01); *H04B 7/0617* (2013.01); *H04B 7/0897* (2013.01); *H04W 52/225* (2013.01); *H04W 52/30* (2013.01); *H04W 52/42* (2013.01); *H04L 27/2626* (2013.01)

(58) Field of Classification Search
CPC ........................................................ H04B 7/02
USPC ................................. 375/267, 295, 260, 259
See application file for complete search history.

(56) References Cited

U.S. PATENT DOCUMENTS

2008/0159425 A1* 7/2008 Khojastepour et al. ........ 375/260
2008/0310523 A1* 12/2008 Hui et al. ...................... 375/260
(Continued)

FOREIGN PATENT DOCUMENTS

EP        2 244 390 A2    10/2010

OTHER PUBLICATIONS

Mo, et al.; "Precoder Design for Non-Regenerative MIMO Relay Systems"; IEEE Transactions on Wireless Communications, vol. 8. No. 10; Oct. 2009, pp. 5041-5049.*
(Continued)

*Primary Examiner* — Kevin M Burd

(57) ABSTRACT

A method, apparatus, and system to transmit signals using multiple antennas with per-antenna power constraints. The method includes initializing a precoding algorithm to a complex matrix. The precoding algorithm is for precoding signals transmitted by a plurality of antennas. The method includes iteratively processing the precoding algorithm on a per-antenna basis by, at each iteration, sequentially updating a precoder for each of the plurality of antennas. The method includes, after each iteration, determining whether the precoding algorithm has converged based on a change in a rate of mutual information across iterations. Additionally, the method includes, in response to determining that the precoding algorithm has converged, transmitting the signals using the precoding algorithm.

20 Claims, 6 Drawing Sheets

(51) Int. Cl.
*H04B 7/08* (2006.01)
*H04W 52/22* (2009.01)
*H04W 52/30* (2009.01)
*H04W 52/42* (2009.01)
*H04L 27/26* (2006.01)

(56) References Cited

U.S. PATENT DOCUMENTS

| | | |
|---|---|---|
| 2010/0272211 A1 | 10/2010 | Ohwatari et al. |
| 2011/0064158 A1* | 3/2011 | Li et al. .......... 375/267 |
| 2011/0080961 A1* | 4/2011 | Hui et al. .......... 375/259 |
| 2011/0096859 A1* | 4/2011 | Kim et al. .......... 375/267 |
| 2011/0205118 A1* | 8/2011 | Ojard et al. .......... 342/373 |

OTHER PUBLICATIONS

International Search Report dated Feb. 26, 2013 in connection with International Patent Application No. PCT/KR2012/007019, 3 pages.
Written Opinion of International Searching Authority dated Feb. 26, 2013 in connection with International Patent Application No. PCT/KR2012/007019, 4 pages.
Karaa, et al.; "Linear Precoding for Multiuser MIMO-OFDM Systems"; IEEE Communications Society; 2007 proceedings; pp. 2797-2802.
Extended European Search Report dated May 8, 2015 in connection with European Patent Application No. 12828430.4, 5 pages.
Kim, et al.; "Optimal Resource Allocation for MIMO Ad Hoc Cognitive Radio Networks"; IEEE Transactions on Information Theory, vol. 57, No. 5,; May 2011; 15 pages.

* cited by examiner

MULTIPLE ANTENNA TRANSMISSION WITH PER-ANTENNA POWER CONSTRAINTS

CROSS-REFERENCE TO RELATED APPLICATION(S) AND CLAIM OF PRIORITY

The present application is related to U.S. Provisional Patent Application No. 61/529,575, filed Aug. 31, 2011, entitled "METHODS AND APPARATUS TO TRANSMIT AND RECEIVE SIGNALS USING MULTIPLE ANTENNAS"; U.S. Provisional Patent Application No. 61/531,469, filed Sep. 6, 2011, entitled "METHODS AND APPARATUS FOR BEAMFORMING USING MULTIPLE ANTENNAS WITH ELEMENT-WISE POWER CONSTRAINTS"; U.S. Provisional Patent Application No. 61/533,644, filed Sep. 12, 2011, entitled "TRANSMISSION SCHEMES FOR MULTI-ANTENNA SYSTEMS WITH PER-ANTENNA POWER CONSTRAINTS"; and U.S. Provisional Patent Application No. 61/540,284, filed Sep. 28, 2011, entitled "METHODS FOR TRANSMITTING SIGNALS IN MULTI-ANTENNA SYSTEMS WITH PER-ANTENNA POWER CONSTRAINTS". Provisional Patent Application Nos. 61/529,575, 61/531,469, 61/533,644 and 61/540,284 are assigned to the assignee of the present application and is hereby incorporated by reference into the present application as if fully set forth herein. The present application hereby claims priority under 35 U.S.C. §119(e) to U.S. Provisional Patent Application Nos. 61/529,575, 61/531,469, 61/533,644 and 61/540,284.

TECHNICAL FIELD

The present application relates generally to multiple antenna wireless communication systems and, more specifically, to multiple antenna transmission schemes with per-antenna power constraints.

BACKGROUND

As multiple-input multiple-output (MIMO) technology has developed over the years, the number of antennas in the deployed MIMO systems has been steadily increasing. The concept of using a large number (hundreds or thousands) of antennas has also been brought up from an information theory perspective. However, the challenges of implementing hundreds or thousands of antennas in conventional cellular systems have been prohibitive. For example, to accommodate 1024 half-wavelength antennas in 2G Hz band, the dimension of the antenna array will be around 2.4 m×2.4 m.

Proposals for a mobile broadband system using millimeter-wave bands (MMB) have opened up opportunities to bring large MIMO antenna arrays with hundreds or thousands of antennas. For example, using millimeter-wave frequencies around 30 GHz, the dimension of an antenna array with 1024 antennas is about 16 cm×16 cm, smaller than a single sector antenna for a typical cellular base station.

The transmitter and receiver beamforming in MMB systems are different from the MIMO operations in cellular systems. With possibly thousands of antennas at a base station and hundreds of antennas at a mobile station, the spatial degree of freedom of MMB systems is much larger than that of cellular systems. To drive hundreds or thousands of antennas, a large number of power amplifiers are needed, each having its own power constraint. The design of efficient beamforming schemes to fully utilize the power of all these power amplifiers is an interesting problem with practical significance.

Therefore, there is a need in the art for improved transmission strategies in multiple antenna wireless communication systems. In particular, there is a need for methods and apparatuses that are capable of multiple antenna transmission schemes with per-antenna power constraints.

SUMMARY

A method, apparatus and system to transmit signals using multiple antennas with per-antenna power constraints.

In various embodiments, a method includes initializing a precoding algorithm to a complex matrix. The precoding algorithm is for precoding signals transmitted by a plurality of antennas. The method includes iteratively processing the precoding algorithm on a per-antenna basis by, at each iteration, sequentially updating a precoder for each of the plurality of antennas. The method includes, after each iteration, determining whether the precoding algorithm has converged based on a change in a rate of mutual information across iterations. Additionally, the method includes, in response to determining that the precoding algorithm converged, transmitting the signals using the precoding algorithm.

In various embodiments, an apparatus includes a controller, a precoding unit and a plurality of antennas. The controller is configured to initialize a precoding algorithm to a complex matrix. The precoding algorithm is for precoding signals transmitted by a plurality of antennas. The controller is configured to iteratively process the precoding algorithm on a per-antenna basis by, at each iteration, sequentially updating a precoder for each of the plurality of antennas. Additionally, the controller is configured to, after each iteration, determine whether the precoding algorithm has converged based on a change in a rate of mutual information across iterations. The precoding unit is configured to, in response to a determination that the precoding algorithm converged, precode the signals using the precoding algorithm. The plurality of antennas is configured to transmit the precoded signals.

Before undertaking the DETAILED DESCRIPTION OF THE INVENTION below, it may be advantageous to set forth definitions of certain words and phrases used throughout this patent document: the terms "include" and "comprise," as well as derivatives thereof, mean inclusion without limitation; the term "or," is inclusive, meaning and/or; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like; and the term "controller" means any device, system or part thereof that controls at least one operation, such a device may be implemented in hardware, firmware or software, or some combination of at least two of the same. It should be noted that the functionality associated with any particular controller may be centralized or distributed, whether locally or remotely. Definitions for certain words and phrases are provided throughout this patent document, those of ordinary skill in the art should understand that in many, if not most instances, such definitions apply to prior, as well as future uses of such defined words and phrases.

BRIEF DESCRIPTION OF THE DRAWINGS

For a more complete understanding of the present disclosure and its advantages, reference is now made to the following description taken in conjunction with the accompanying drawings, in which like reference numerals represent like parts.

DETAILED DESCRIPTION

FIGS. 1 through 7, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged system or device.

Figure 1:
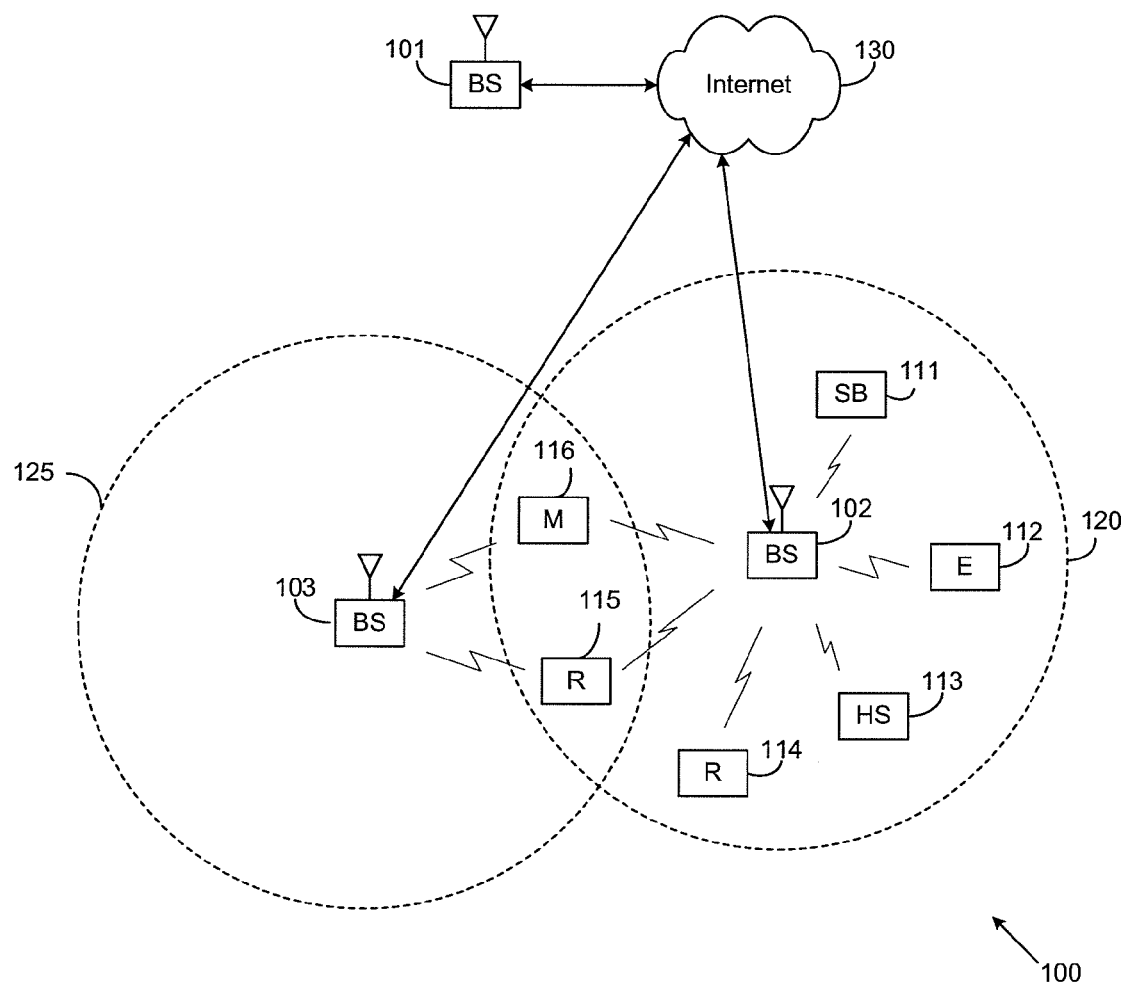
FIG. 1 illustrates an exemplary wireless system which transmits messages in accordance with an illustrative embodiment of the present disclosure.
Figure 2:
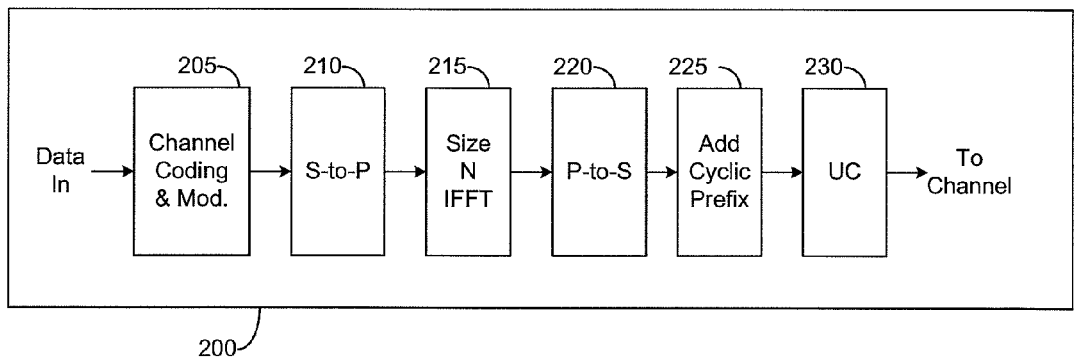
FIG. 2 illustrates a high-level diagram of an orthogonal frequency division multiple access transmit path in accordance with an illustrative embodiment of the present disclosure.
Figure 3:
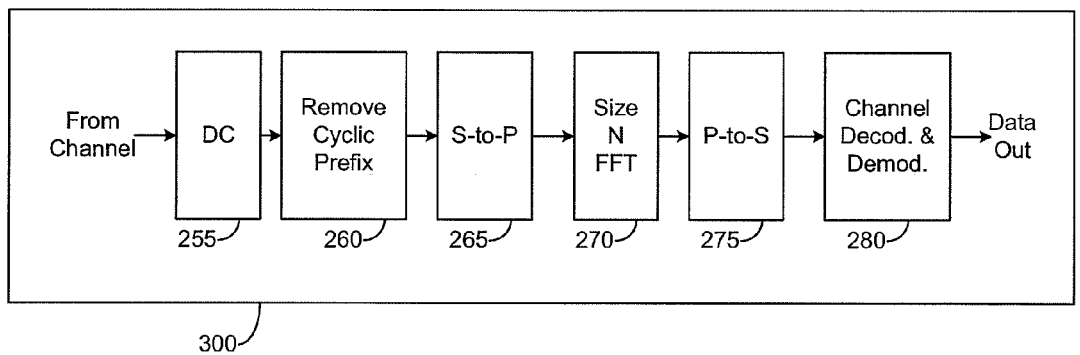
FIG. 3 illustrates a high-level diagram of an orthogonal frequency division multiple access receive path in accordance with an illustrative embodiment of the present disclosure.

FIGS. 1-3 below describe various embodiments implemented in wireless communications systems and with the use of OFDM or OFDMA communication techniques. The description of FIGS. 1-3 is not meant to imply physical or architectural limitations to the manner in which different embodiments may be implemented. Different embodiments of the present disclosure may be implemented in any suitably arranged communications system.

FIG. 1 illustrates exemplary wireless system 100, which transmits messages according to the principles of the present disclosure. In the illustrated embodiment, wireless system 100 includes base station (BS) 101, base station (BS) 102, base station (BS) 103, and other similar base stations or relay stations (not shown). Base station 101 is in communication with base station 102 and base station 103. Base station 101 is also in communication with Internet 130 or a similar IP-based system (not shown).

Base station 102 provides wireless broadband access (via base station 101) to Internet 130 to a first plurality of subscriber stations (or user equipment (UE)) within coverage area 120 of base station 102. The first plurality of subscriber stations includes subscriber station 111, which may be located in a small business (SB); subscriber station 112, which may be located in an enterprise (E); subscriber station 113, which may be located in a WiFi hotspot (HS); subscriber station 114, which may be located in a first residence (R); subscriber station 115, which may be located in a second residence (R); and subscriber station 116, which may be a mobile device (M), such as a cell phone, a wireless laptop, a wireless PDA, or the like.

Base station 103 provides wireless broadband access (via base station 101) to Internet 130 to a second plurality of subscriber stations within coverage area 125 of base station 103. The second plurality of subscriber stations includes subscriber station 115 and subscriber station 116. In an exemplary embodiment, base stations 101-103 may communicate with each other and with subscriber stations 111-116 using OFDM or OFDMA techniques.

While only six subscriber stations are depicted in FIG. 1, it is understood that wireless system 100 may provide wireless broadband access to additional subscriber stations. It is noted that subscriber station 115 and subscriber station 116 are located on the edges of both coverage area 120 and coverage area 125. Subscriber station 115 and subscriber station 116 each communicate with both base station 102 and base station 103 and may be said to be operating in handoff mode, as known to those of skill in the art.

Subscriber stations 111-116 may access voice, data, video, video conferencing, and/or other broadband services via Internet 130. In an exemplary embodiment, one or more of subscriber stations 111-116 may be associated with an access point (AP) of a WiFi WLAN. Subscriber station 116 may be any of a number of mobile devices, including a wireless-enabled laptop computer, personal data assistant, notebook, handheld device, or other wireless-enabled device. Subscriber stations 114 and 115 may be, for example, a wireless-enabled personal computer (PC), a laptop computer, a gateway, or another device.

FIG. 2 is a high-level diagram of transmit path circuitry 200. For example, the transmit path circuitry 200 may be used for an orthogonal frequency division multiple access (OFDMA) communication. FIG. 3 is a high-level diagram of receive path circuitry 300. For example, the receive path circuitry 300 may be used for an orthogonal frequency division multiple access (OFDMA) communication. In FIGS. 2 and 3, for downlink communication, the transmit path circuitry 200 may be implemented in base station (BS) 102 or a relay station, and the receive path circuitry 300 may be implemented in a subscriber station (e.g. subscriber station 116 of FIG. 1). In other examples, for uplink communication, the receive path circuitry 300 may be implemented in a base station (e.g. base station 102 of FIG. 1) or a relay station, and the transmit path circuitry 200 may be implemented in a subscriber station (e.g. subscriber station 116 of FIG. 1).

Transmit path circuitry 200 comprises channel coding and modulation block 205, serial-to-parallel (S-to-P) block 210, Size N Inverse Fast Fourier Transform (IFFT) block 215, parallel-to-serial (P-to-S) block 220, add cyclic prefix block 225, and up-converter (UC) 230. Receive path circuitry 300 comprises down-converter (DC) 255, remove cyclic prefix block 260, serial-to-parallel (S-to-P) block 265, Size N Fast Fourier Transform (FFT) block 270, parallel-to-serial (P-to-S) block 275, and channel decoding and demodulation block 280.

At least some of the components in FIGS. 2 and 3 may be implemented in software, while other components may be implemented by configurable hardware or a mixture of software and configurable hardware. In particular, it is noted that the FFT blocks and the IFFT blocks described in this disclosure document may be implemented as configurable software algorithms, where the value of Size N may be modified according to the implementation.

Furthermore, although this disclosure is directed to an embodiment that implements the Fast Fourier Transform and the Inverse Fast Fourier Transform, this is by way of illustration only and should not be construed to limit the scope of the disclosure. It will be appreciated that in an alternate embodiment of the disclosure, the Fast Fourier Transform functions and the Inverse Fast Fourier Transform functions may easily be replaced by Discrete Fourier Transform (DFT) functions and Inverse Discrete Fourier Transform (IDFT) functions, respectively. It will be appreciated that for DFT and IDFT functions, the value of the N variable may be any integer number (i.e., 1, 2, 3, 4, etc.), while for FFT and IFFT functions, the value of the N variable may be any integer number that is a power of two (i.e., 1, 2, 4, 8, 16, etc.).

In transmit path circuitry 200, channel coding and modulation block 205 receives a set of information bits, applies coding (e.g., LDPC coding) and modulates (e.g., Quadrature Phase Shift Keying (QPSK) or Quadrature Amplitude Modulation (QAM)) the input bits to produce a sequence of frequency-domain modulation symbols. Serial-to-parallel block 210 converts (i.e., de-multiplexes) the serial modulated symbols to parallel data to produce N parallel symbol streams where N is the IFFT/FFT size used in BS 102 and SS 116. Size N IFFT block 215 then performs an IFFT operation on the N parallel symbol streams to produce time-domain output signals. Parallel-to-serial block 220 converts (i.e., multiplexes) the parallel time-domain output symbols from Size N IFFT block 215 to produce a serial time-domain signal. Add cyclic prefix block 225 then inserts a cyclic prefix to the time-domain signal. Finally, up-converter 230 modulates (i.e., up-converts) the output of add cyclic prefix block 225 to RF frequency for transmission via a wireless channel. The signal may also be filtered at baseband before conversion to RF frequency.

The transmitted RF signal arrives at SS 116 after passing through the wireless channel, and reverse operations to those at BS 102 are performed. Down-converter 255 down-converts the received signal to baseband frequency, and remove cyclic prefix block 260 removes the cyclic prefix to produce the serial time-domain baseband signal. Serial-to-parallel block 265 converts the time-domain baseband signal to parallel time-domain signals. Size N FFT block 270 then performs an FFT algorithm to produce N parallel frequency-domain signals. Parallel-to-serial block 275 converts the parallel frequency-domain signals to a sequence of modulated data symbols. Channel decoding and demodulation block 280 demodulates and then decodes the modulated symbols to recover the original input data stream.

Each of base stations 101-103 may implement a transmit path that is analogous to transmitting in the downlink to subscriber stations 111-116 and may implement a receive path that is analogous to receiving in the uplink from subscriber stations 111-116. Similarly, each one of subscriber stations 111-116 may implement a transmit path corresponding to the architecture for transmitting in the uplink to base stations 101-103 and may implement a receive path corresponding to the architecture for receiving in the downlink from base stations 101-103.

Various embodiments of the present disclosure recognize that beamforming using arrays with a large number of antennas is a fundamental enabling technology in millimeter-wave mobile communication. Transmitter and receiver beamforming can extend the range of millimeter-wave links, improve signal reception, and suppress interference among beams and neighboring cells. In order to effectively communicate over millimeter waves links, it is crucial for the transmitters and receivers to identify the strongest reflections and form transmitter and receiver beams along these paths. This can be achieved by beamforming with large antenna arrays.

The optimal transmission strategy, given the knowledge of channel station information at the transmitter and with total power constraint, is a "water-filling" strategy along the transmitter side singular vectors of the channel matrix. The optimal transmission strategy with per-antenna power constraints, however, has been a difficult problem. There is a general lack of understanding about the optimal transmission schemes and their performance for MIMO systems with per-antenna power constraints.

The present disclosure provides optimal transmission strategies with per-antenna power constraints as convex programming problems on convex regions and derives the necessary and sufficient conditions for optimality based on the Karush-Khun-Tucker (KKT) conditions. The present disclosure provides iterative algorithms that converge to the optimal solutions.

Although the present disclosure describes solutions to problems in millimeter-wave mobile communication, the embodiments of the present disclosure are applicable to MIMO and beamforming in conventional 3G and 4 G communication systems as well.

Figure 4:
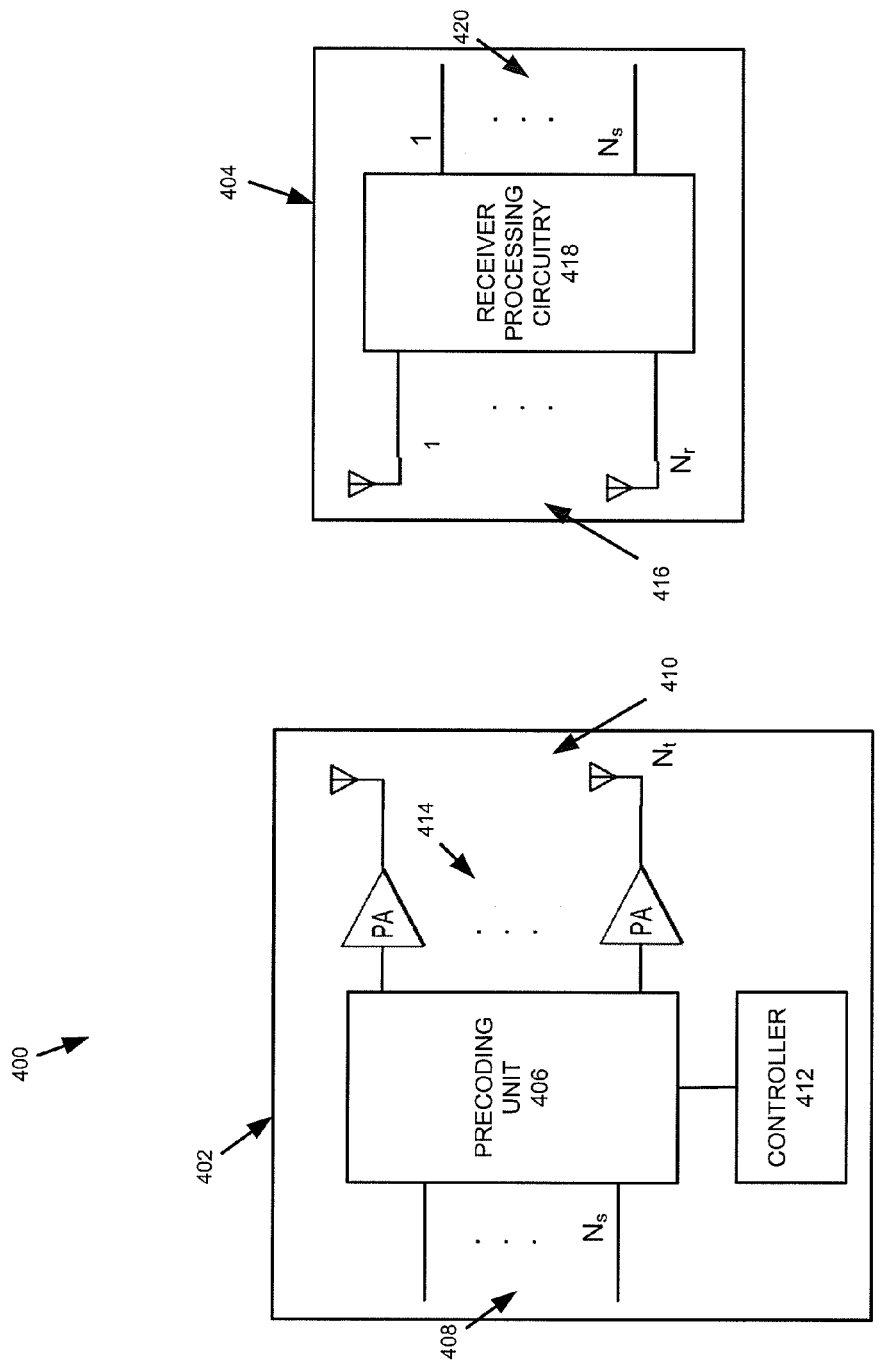
FIG. 4 illustrates a block diagram of a wireless communication system in accordance with the present disclosure.

FIG. 4 illustrates a block diagram of a wireless communication system 400 in accordance with the present disclosure. Wireless communication system 400 includes transmitter 402 and receiver 404. Transmitter 402 transmits signals at a transmit end in wireless communication system 400. For example, the transmitter 402 may be a transmitter in a base station (e.g. base station 102 of FIG. 1) or relay station for downlink communication. In other embodiments, the transmitter 402 may be a transmitter in a subscriber station (e.g. subscriber station 116 of FIG. 1) for uplink communications.

The transmitter 402 includes a precoding unit 406 to precode data streams 408 to be transmitted by antennas 410. The controller 412 estimates channel properties and receives information about the properties of the receiver 404. The controller 412 calculates precoding algorithms for the precoding unit 406 to use in precoding the signals transmitted by the antennas 410. For example, in some embodiments, the transmitter 402 may implement a transmit path as shown in FIG. 2. The transmitter 402 also includes a plurality of power amplifiers 414. The power amplifiers 414 amplify the transmit power of the signals transmitted by the antennas 410. While FIG. 4 shows power amplifiers 414 connected in series with the antennas 410, any type of connections between the power amplifiers 414 and the antennas 410 may exist in the transmitter 402. For example, in various embodiments, one power amplifier 414 may be connected to a single antenna or multiple antennas in the antenna array 410. In other examples, each of the power amplifiers 414 may be connected to each of the antennas 410.

The receiver 404 receives signals at a receive end in wireless communication system 400. For example, the receiver 404 may be a receiver in a subscriber station (e.g. subscriber station 116 of FIG. 1) for downlink communication. In other embodiments, the transmitter 402 may be a transmitter for a base station (e.g. base station 102 of FIG. 1) or a relay station for uplink communications. The receiver 404 includes antennas 416 to receive signals transmitted in the wireless communication system 400. The receiver processing circuitry 418 processes the received signals to identify the received data streams 420. For example, in some embodiments, the receiver 404 may implement a receive path as shown in FIG. 3.

In these illustrative embodiments, the transmitter 402 transmits a single stream or multiple streams of data using multiple antennas 410 with element-wise power constraints. For example, the number of transmit antennas 410 is denoted as $N_t$, and the number of receiver antennas 416 is denoted as $N_r$. In this example, the general signal model for transmitter beamforming can be represented according to equation 1 below:

$$r = HVs + n \quad \text{(Equation 1)}$$

where s, V, r, n, and H are the transmitted signal vector, the transmitter beamformer, the received signal vector, the noise vector, and the channel matrix, respectively. The number of signal streams 408 is denoted by $N_s$. Without loss of generality, the present disclosure assumes that $N_s \leq \min(N_r, N_t)$ and the signal streams are independent with unity total transmission power, (i.e., $E\{s_i^* s_j\} = 0$ if $i \neq j$, and $E\{s^\dagger s\} = 1$).

Without per-antenna power constraints, the capacity-achieving transmission and reception strategy can be easily obtained. The present disclosure provides transmitter beamforming strategies that maximize or increase mutual information with per-antenna power constraints.

In MMB systems, the transmission and reception of millimeter waves are often highly directional, which limits the number of paths the signal can travel from the transmitter 402 to the receiver 404. In addition, the number of rays that can reach the receiver and are strong enough to be detected by the receiver 404 is likely to be small due to the scarcity of scattering and large propagation loss. Thus, the present disclosure uses a simplified ray tracing model to characterize the MMB channel.

Figure 5:
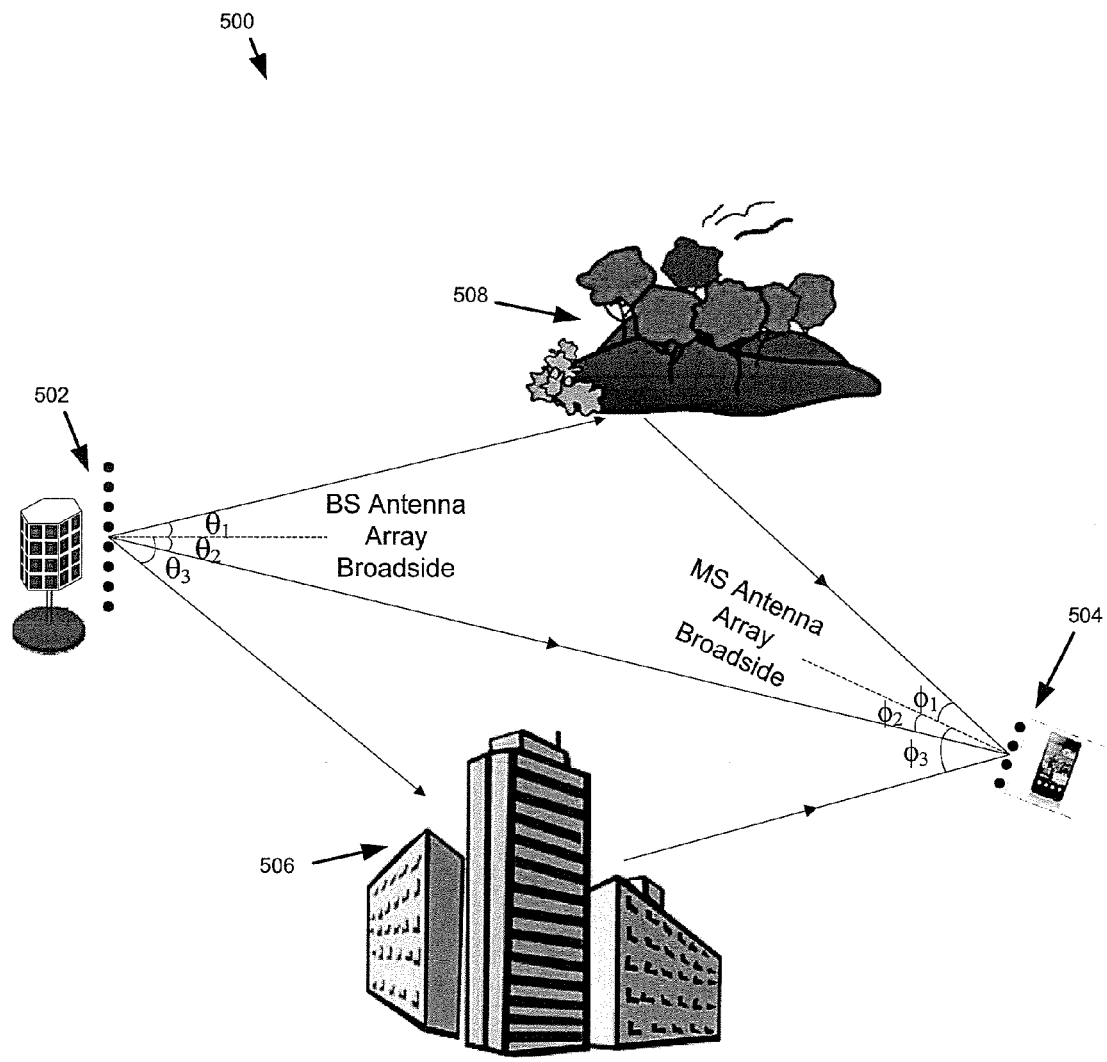
FIG. 5 illustrates an example of a channel condition model for multiple antenna transmission in a wireless communication system in accordance with various embodiments of the present disclosure.

FIG. 5 illustrates an example of a channel condition model for multiple antenna transmission in a wireless communication system 500 in accordance with various embodiments of the present disclosure. For example, wireless communication system 500 in FIG. 5 is one example of wireless communication system 400 in FIG. 4. In the wireless communication system 400, the base station 502 transmits multiple wireless signals to the mobile station 504. Some of these signals may have a direct line of sight from the base station 502 to the mobile station 504. Other signals may reflect or refract off obstacles (e.g., buildings 506 or trees 508) along the path between the base station 502 to the mobile station 504.

FIG. 5 illustrates a simplified MMB channel model. The number of rays from the base station 502 to the mobile station 504 is denoted by C. The angle of arrival (AoA) and angle of departure (AoD) for the c-th ray are denoted as $\theta_c$ and $\phi_c$, respectively. Assuming an exemplary linear array, the receiver array response vector for AoA $\theta$ can be represented according to equation 2 below:

$$\alpha(\theta) = [1 \, e^{i\Delta_r} \, \ldots \, e^{i(L-1)\Delta_r}]^T \quad \text{(Equation 2)}$$

where $\Delta_r = 2\pi d_r \sin\theta/\lambda$ and $d_r$ is the antenna spacing for the receiver antenna array 416. Assuming an exemplary linear array, the transmitter array response vector for AoD $\phi$ can be represented according to equation 3 below:

$$\beta(\phi) = [1 \, e^{i\Delta_t} \, \ldots \, e^{i(K-1)\Delta_t}]^T \quad \text{(Equation 3)}$$

where $\Delta_t = 2\pi d_t \sin\phi/\lambda$ and $d_t$ is the antenna spacing for the transmitter antenna array. The use of a linear array is for illustration purposes only and other antenna configurations can also be used. The channel can be represented in matrix form according to equation 4 below:

$$H = \sum_{c=1}^{C} \sqrt{\rho_c} \cdot \alpha(\theta_c) \cdot \beta^\dagger(\phi_c) \cdot \gamma_c = A\Gamma B^\dagger \quad \text{(Equation 4)}$$

where A is the receiver array response of the channel, B is the transmitter array response of the channel, and $\Gamma$ is the diagonal matrix representing the channel coefficients of the ray-tracing channel model. In other words, $A = [\alpha(\theta_1) \, \alpha(\theta_2) \, \ldots \, \alpha(\theta_C)]$;

$$\Gamma = \begin{bmatrix} \sqrt{\rho_1}\,\gamma_1 & 0 & \ldots & 0 \\ 0 & \sqrt{\rho_2}\,\gamma_2 & \ldots & 0 \\ \vdots & \vdots & \ddots & \vdots \\ 0 & 0 & \ldots & \sqrt{\rho_C}\,\gamma_C \end{bmatrix}; \text{ and}$$

$$B = [\beta(\phi_1) \, \beta(\phi_2) \, \ldots \, \beta(\phi_C)]$$

where $\rho_c$ is the power of the c-th ray with $\sum_{c=1}^{C} \rho_c = 1$, and $\gamma_c$ is the normalized complex channel coefficient for the c-th ray, (i.e., $E\|\gamma_c\|^2 = 1$).

Referring back to FIG. 4, single-stream beamforming (i.e., $N_s = 1$) is of practical interest as single-stream transmission happens often in MIMO systems. Transmissions in low signal to noise ratio (SNR) conditions are often single-stream. Also transmissions to or from a mobile station with a single antenna is single-stream. When the channel is highly correlated, transmission is also likely to be single-stream.

With per-antenna power constraints, the optimal transmitter beamformer is the solution to the following optimization problem and can be represented according to equation 5 below:

$$v^{opt} = \arg\max_v \log\left(1 + \frac{1}{\sigma^2} v^\dagger F v\right) \text{ s.t.} \quad \text{(Equation 5)}$$

$$v_i^* v_i = p_i, i = 1, 2, \ldots, N_t$$

where $F = H^\dagger H$, $v = [v_1 \, v_2 \, \ldots \, v_{N_t}]^T$ is a single-stream beamformer, and $p_i > 0$ is the power constraint on an i-th antenna. Without loss of generality, the present disclosure assumes that $f_{ii} = \sum_{k=1}^{N_r} \|h_{ki}\|^2 > 0$, $i = 1, 2, \ldots, N_t$. Otherwise, the transmitter antennas 410 that do not contribute to the mutual information can be simply removed. Note that in these examples, optimal receiver 404 is assumed so that the achievable mutual information is only a function of transmitter beamforming. Although the objective function of problem is convex, the region defined by the per-antenna power constraints is not. In order to avoid the difficulty of optimizing on a non-convex region, the present disclosure addresses a slightly different problem by allowing the per-antenna power constraints to slack. The alternative problem can be represented according to equation 6 below:

$$v^{opt} = \arg\max_v \log\left(1 + \frac{1}{\sigma^2} v^\dagger F v\right) \text{ s.t.} \quad \text{(Equation 6)}$$

$$g_i(v) = v_i^* v_i - p_i \leq 0, i = 1, 2, \ldots, N_t.$$

It is easy to verify that, in this example, the region defined by the relaxed per-antenna power constraints is convex. This convex region defined over $\mathbb{C}^N$, however, is not friendly for mathematical manipulation as any non-constant real valued function $f: \mathbb{C}^N \to \mathbb{R}$ does not satisfy the Cauchy-Riemann criteria, and thus, it is not analytic. To avoid the problem of undefined derivative of the real objective function on complex variables, the present disclosure reformulates the optimization problem into a real function $\tilde{f}: \mathbb{R}^{2N} \to \mathbb{R}$. For example, by denoting $f(v)=$ $$\log\left(1 + \frac{1}{\sigma^2} v^\dagger F v\right)$$

and letting $v=x+jy$, the objective function can be equivalently defined as a real function on $\mathbb{R}^{2N}$ represented according to equation 7 below:

$$\tilde{f}(x, y) = \qquad \text{(Equation 7)}$$
$$\log\left[1 + \frac{1}{\sigma^2}(x^T - jy^T)F(x + jy)\right] = \log\left(1 + \frac{1}{\sigma^2} v^\dagger F v\right) = f(v).$$

The constraints can also be represented as functions of real variables represented according to equation 8 below:

$$\tilde{g}_i(x,y) = x_i^2 + y_i^2 - p_i \le 0, \, i=1,2,\ldots,N_t \qquad \text{(Equation 8)}.$$

The present disclosure then constructs an equivalent optimization problem with real variables and a real objective function for the problem represented by equation 6 as can be represented according to equation 9 below:

$$(x^{opt}, y^{opt}) = \underset{x,y}{\mathrm{argmax}}\, \tilde{f}(x, y) \text{ s.t.} \qquad \text{(Equation 9)}$$
$$\tilde{g}_i(x, y) \le 0, \, i = 1, 2, \ldots, N_t.$$

As a result, $\tilde{f}(x,y)$ is convex and the region on $\mathbb{R}^{2N}$ as defined by the per-antenna power constraints is also convex. Also, the optimal beamformer of equation 9 is at the boundary of the convex region with all per-antenna power constraints binding. This can be proven by contradiction as follows: for any vector $v=x+jy$, assuming the power constraint on the k-th antenna is not binding, i.e., $g_k(x,y)=x_k^2+y_k^2-p_k<0$, let $\delta_k = \sqrt{p_k-(x_k^2+y_k^2)}$, and $\epsilon=\psi(\Sigma_{i=1}^{N_t} f_{ik} v_i) \cdot \delta_k e_k$, where $e_k$ is a column vector with $e_{ki}=1$ if $i=k$ and $e_{ki}=0$ otherwise, and $\psi(w)$ represents the phase of a complex variable w, (i.e., $$\psi(w) = \begin{cases} 1, & \text{if } w = 0 \\ \frac{w}{\|w\|}, & \text{otherwise} \end{cases}.$$

Then $v+\epsilon$ also satisfies the power constraints on all the antennas. However, $(v+\epsilon)^\dagger F(v+\epsilon) = v^\dagger F v + v^\dagger F \epsilon + \epsilon^\dagger F v + \epsilon^\dagger F \epsilon = v^\dagger F v + \epsilon^\dagger F \epsilon + 2\delta_k \|\Sigma_{i=1}^{N_t} f_{ik} v_i\| > v^\dagger F v$. This contradicts the assumption that $v=x+jy$ is the optimal solution to the problem represented by equation 9. Therefore, any optimal solution to the problem represented by equation 9 must meet all per-antenna power constraints with equality. Basically, this illustrates that the solution for the alternative optimization problem represented by equation 9 is also optimal for the original problem represented by equation 8.

For example, a single-stream beamformer $v^{opt}$ is an optimal solution for the problem represented by equation 8 if, and only if, the single-stream beamformer satisfies the following conditions represented according to equation 10 below:

$$v_i^{opt} = \psi(\Sigma_{k \ne i} f_{ik} v_k^{opt}) \cdot \sqrt{p_i}, \, i=1,\ldots,N_t \qquad \text{(Equation 10)}$$

where $f_{ik}$ is the element of F at the i-th row and the k-th column.

The present disclosure verifies that the optimization problem represented by equation 9 satisfies the Slater's condition if $p_i > 0, \forall i$. Thus, the KKT conditions are both necessary and sufficient for optimality. The present disclosure verifies that the KKT conditions can be represented according to equation 11 below:

$$\mu_i^{opt} = \frac{1}{\sigma^2 + (v^{opt})^\dagger F v^{opt}} \cdot \left( f_{ii} + \frac{\left\|\sum_{k \ne i} f_{ik} v_k^{opt}\right\|}{\sqrt{p_i}} \right) \qquad \text{(Equation 11)}$$

$$x_i^{opt} = \mathrm{Re}\left\{\psi\left(\sum_{k \ne i} f_{ik} v_k^{opt}\right)\right\} \cdot \sqrt{p_i}$$

$$y_i^{opt} = \mathrm{Im}\left\{\psi\left(\sum_{k \ne i} f_{ik} v_k^{opt}\right)\right\} \cdot \sqrt{p_i}$$

for $k = 1, \ldots, N_t$ where $\mu_i^{opt} \ge 0$, $i=1,\ldots,N_t$ are the Lagrange multipliers for the optimal solution, and $v^{opt}=x^{opt}+jy^{opt}$. Note that $\mu_i$, $i=1,\ldots,N_t$ are the auxiliary variables introduced, and the existence of $\mu_i^{opt} \ge 0$, $i=1,\ldots,N_t$ is shown by equation 11. Also, the solutions for $x_i^{opt}$, $y_i^{opt}$ can be consolidated into one single equation of $v_i^{opt}$. Finally, the necessary and sufficient conditions for the optimal solution can be consolidated as represented according to equation 12 below:

$$v_i^{opt} = \psi(\Sigma_{k \ne i} f_{ik} v_k^{opt}) \cdot \sqrt{p_i}, \text{ for } k=1,\ldots,N_t \qquad \text{(Equation 12)},$$

which is equivalent to the optimality conditions shown in equation 10. This solution is also the optimal solution for the problem represented by equation 5.

Therefore, as long as the solution satisfies equation 12, the solution will be the optimal solution of the problem represented by equation 5. Table 1 provides an iterative algorithm to find such an optimal solution of single-stream beamforming as follows:

TABLE 1

Optimal Single-Stream Tx Beamforming

1. Initialize v to a complex vector such that $\|v_i\|^2 = p_i$, $i = 1, \ldots, N_t$.
2. In the n-th iteration, update $v_i$ sequentially for $i = 1 \ldots, N_t$, $v_i = \psi(\Sigma_{k \ne i} f_{ik} v_k) \cdot \sqrt{p_i}$
3. Check convergence. If yes, stop; if not, go to Step 2.

The iterative algorithm outlined in Table 1 converges to an optimal solution of the problem represented by equation 5. For example, through the iterations of the algorithm, the complex beamforming weights on all antennas are updated, one at a time. Before an update for the i-th antenna, the value of the objective function of the problem represented by equation 5 is $$\log\left(1 + \frac{1}{\sigma^2} v^\dagger F v\right) = \log \frac{\left[1 + \frac{1}{\sigma^2} \sum_{j \ne i} \sum_{k \ne i} v_j^* f_{jk} v_k + \right.}{\left(\frac{1}{\sigma^2} \sum_{j \ne i} v_j^* f_{ij}\right) v_i + \left(\frac{1}{\sigma^2} \sum_{k \ne i} f_{ik} v_k\right) v_i^* + \frac{1}{\sigma^2} f_{ii} v_i^* v_i\right]}.$$

It can be verified that the update $v_i\psi(\Sigma_{k\neq i}f_{ik}v_k)\cdot\sqrt{p_i}$ maximizes the objective function given the power constraint on the i-th antenna, assuming that all other $v_k$, $k\neq i$, are unchanged. As a result, the objective function is non-decreasing in every step of each iteration.

The present disclosure recognizes that the objective function is bounded (e.g., by the channel capacity without the per-antenna power constraints but with total power constraint that equals the sum of all the per-antenna power constraints). As a result, the objective function will converge to a certain limit. When the objective function converges, the condition $v_i=\psi(\Sigma_{k\neq i}f_{ik}v_k)\cdot\sqrt{p_i}$ is met for all $i=1, \ldots, N_t$. Based on the conditions associated with equation 12, the solution is an optimal solution for the problem represented by equation 5.

For practical purposes, since maximizing the achievable mutual information is desirable, the change rate of the mutual information across iterations can be used as an indication of convergence. For example, with the achieved mutual information after the n-th iteration denoted as $$f(n) = \log\left[1 + \frac{1}{\sigma^2}v^\dagger(n)Fv(n)\right]$$

convergence is determined to occur if $$\frac{f(n) - f(n-1)}{f(n)} < \varepsilon.$$

In these embodiments, the convergence criteria should only be applied between iterations, not between the updates for different antennas within iteration, as it is possible that convergence has not been reached although the update for a single antenna does not increase the objective function. To evaluate how fast the algorithm converges, the mutual information gap for the n-th iteration may be calculated according to equation 13 below:

$$\tau(n) = \frac{f(\infty) - f(n)}{f(\infty)} \quad \text{(Equation 13)}$$

where $f(\infty)$ denotes the maximum achievable mutual information given the per-antenna power constraints.

Various embodiments provide precoding algorithms for multi-stream beamforming (i.e., $N_s > 1$) with element-wise power constraints. Without element-wise power constraints, the capacity achieving transmission and reception strategy is to diagonalize the channel via transmitter and receiver beamforming using the left and right singular vectors of the channel and apply "water filling" along the diagonalized channel. The present disclosure provides a transmitter beamforming strategy that maximizes mutual information with element-wise power constraints. For example, in various embodiments, the present disclosure applies similar techniques as in single-stream beamforming to analyze multi-stream beamforming per-antenna power constraints.

The per-antenna power constraints are assumed to be applied at each MIMO stream. This is often the case when power allocation among the multiple streams is not supported. For example, in single-user MIMO in LTE, the power between the multiple streams is assumed to be equal to save signaling overhead and simplify the transceiver modem implementation. In this example, the optimization problem with per-antenna power constraints can be formulated according to equation 14 below:

$$V^{opt} = \arg\max_V \log\left|I_{N_s} + \frac{1}{\sigma^2}V^\dagger FV\right| \text{ s.t.} \quad \text{(Equation 14)}$$

$$v_{ik}v_{ik}^* = p_{ik}, \text{ for } i=1, \ldots, N_t, k=1, \ldots N_s$$

where $V=[v_1\ v_2 \ldots v_{N_s}]$ is the multi-stream beam-former, and $p_{ik} > 0$, for $i=1, \ldots, N_t$, $k=1, \ldots, N_s$ are the per-antenna power constraints for all streams. Again, without loss of generality, the present disclosure assumes $f_{ii} > 0$, $i=1, 2, \ldots, N_t$. Similarly, as in the single-stream beamforming case, the present disclosure illustrates that the optimal solution to the problem represented by equation 14 can be found by solving the following problem represented according to equation 15 below:

$$V^{opt} = \arg\max_V \log\left|I_{N_s} + \frac{1}{\sigma^2}V^\dagger FV\right| \text{ s.t.} \quad \text{(Equation 15)}$$

$$v_{ik}v_{ik}^* \leq p_{ik}, \text{ for } i=1, \ldots, N_t, k=1, \ldots N_s.$$

With defining $\overline{V}_k$ as the sub-matrix of V with $v_k$ removed and denoting $$C_k = I + \frac{\overline{V}_k^\dagger F \overline{V}_k}{\sigma^2} \text{ and}$$

$$G^k = F - \frac{1}{\sigma^2}F\overline{V}_k C_k^{-1}\overline{V}_k^\dagger F,$$

the necessary and sufficient conditions for the optimal solution to the problem represented by equation 14 can be expressed as: a multi-stream beamformer V is an optimal solution for the problem represented by equation 14 if, and only if, the solution satisfies the following conditions represented according to equation 16 below:

$$v_{ik}=\psi(\Sigma_{j\neq i}g_{ij}^k v_{jk})\cdot\sqrt{p_{ik}} \quad \text{(Equation 16)}$$

for $i=1, \ldots, N_t$, and $k=1, \ldots, N_s$, where $g_{ij}^k$ is the (i,j)-th entry of matrix $G^k$ denoted above.

To illustrate this result, let $X=\text{Re}\{V\}$, $Y=\text{Im}\{V\}$, and $$\tilde{f}(X, Y) =$$
$$\log\left|I_{N_s} + \frac{1}{\sigma^2}(X^T - jY^T)F(X + jY)\right| = \log\left|I_{N_s} + \frac{1}{\sigma^2}V^\dagger FV\right| = f(V),$$

then an equivalent optimization problem defined on real variables for the problem represented by equation 15 can be represented according to equation 17 below:

$$(X^{opt}, Y^{opt}) = \arg\max_{X,Y} \tilde{f}(X,Y), \text{s.t.}$$

$$g_{ik}(X,Y) = x_{ik}^2 + y_{ik}^2 - p_{ik} \leq 0$$

for $i=1, \ldots, N_t, k=1, \ldots, N_s$ \quad (Equation 17).

Similar to the single-stream beamforming case, the present disclosure illustrates that the optimal solution of the convex optimization problem represented by equation 17 is also the optimal solution of the original problem represented by equation 14 by showing that all the per-antenna power constraints are binding (i.e., $g_{ik}(X,Y)=0$, for $i=1, \ldots N_t$, and $k=1, \ldots, N_s$) for the optimal solution of the problem represented by equation 17.

With some manipulation, the contribution of the k-th stream to the mutual information in the presence of the interference from all other streams can be isolated according to equation 18 below:

$$f(V) = \log \begin{vmatrix} 1 + \frac{v_k^\dagger F v_k}{\sigma^2} & \frac{v_k^\dagger F \overline{V}_k}{\sigma^2} \\ \frac{\overline{V}_k^\dagger F v_k}{\sigma^2} & I + \frac{\overline{V}_k^\dagger F \overline{V}_k}{\sigma^2} \end{vmatrix} \quad \text{(Equation 18)}$$

$$= \log|C_k| + \log\left(1 + \frac{1}{\sigma^2} v_k^\dagger G^k v_k\right)$$

where $C_k$ is defined as denoted above. Using equation 18, the multi-stream beamforming optimization problem can be decomposed into a multiple single-stream beamforming optimization problem. Since $\log|C_k|$ is independent of $v_k$, it becomes clear from equation 18 that in order to maximize $f(V)$, $v_k$ should be chosen such that $$\log\left(1 + \frac{1}{\sigma^2} v_k^\dagger G^k v_k\right)$$

is maximized. Next, this objective function can be shown to also be convex by proving that $G^k$ is positive semi-definite.

Note that if $F=H^\dagger H$ is invertible (i.e., positive definite), $G^k$ can be easily shown to be positive semi-definite because $$G^k = F - \frac{1}{\sigma^2} F \overline{V}_k C_k^{-1} \overline{V}_k^\dagger F = \left(F^{-1} + \frac{1}{\sigma^2} \overline{V}_k \overline{V}_k^\dagger\right)^{-1}.$$

In the more general case when F is positive semi-definite, let $H\overline{V}_k = W\Lambda Z^\dagger$ be the singular-value decomposition (SVD) of $H\overline{V}_k$, where W is a $N_r \times (N_s-1)$ matrix, $\Lambda$ is a $(N_s-1) \times (N_s-1)$ diagonal matrix, and Z is a $(N_s-1) \times (N_s-1)$ unitary matrix. W can be extended to a unitary matrix by adding orthogonal vectors with unit norm, (i.e., denote $[W \ \tilde{W}]$ as the unitary matrix extended from W). Then $G^k$ can be shown to be positive semi-definite as follows, $$G^k = H^\dagger H - \frac{1}{\sigma^2} H^\dagger W \Lambda Z^\dagger \left(I + \frac{Z\Lambda^2 Z^\dagger}{\sigma^2}\right)^{-1} Z \Lambda W^\dagger H =$$

$$H^\dagger \tilde{W} \tilde{W}^\dagger H + H^\dagger W \left[I - \frac{\Lambda}{\sigma^2}\left(I + \frac{\Lambda^2}{\sigma^2}\right)^{-1} \Lambda \right] W^\dagger H =$$

$$H^\dagger \tilde{W} \tilde{W}^\dagger H + H^\dagger W \left(I + \frac{1}{\sigma^2}\Lambda\right)^{-2} W^\dagger H.$$

For any vector x, $x^\dagger G^k x = \|\tilde{W}^\dagger H x\|^2 + \|(I+1\sigma\Lambda-1W\dagger Hx2 \geq 0$, thus, proving Gk is positive semi-definite.

With $G^k$ being positive semi-definite for all streams, it can be shown that the KKT conditions for the problem represented by equation 17 can be represented according to equation 19 below:

$$\mu_{ik}^{opt} = \frac{1}{\sigma^2 + (v_k^{opt})^\dagger G^k v_k^{opt}} \cdot \left(g_{ii}^k + \frac{\left\|\sum_{j \neq i} g_{ij}^k v_{jk}^{opt}\right\|}{\sqrt{p_{ik}}}\right) \quad \text{(Equation 19)}$$

$$x_{ik}^{opt} = \text{Re}\left\{\psi\left(\sum_{j \neq i} g_{ij}^k v_{jk}^{opt}\right)\right\} \cdot \sqrt{p_{ik}}$$

$$y_{ik}^{opt} = \text{Im}\left\{\psi\left(\sum_{j \neq i} g_{ij}^k v_{jk}^{opt}\right)\right\} \cdot \sqrt{p_{ik}}$$

for $i = 1, \ldots, N_t, k = 1, \ldots, N_s$ where $\mu_{ik}^{opt} \geq 0$, $i=1, \ldots, N_t$, $k=1, \ldots, N_s$, are the Lagrange multipliers for the optimal solution.

Since the optimization problem represented by equation satisfies the Slater's condition if $p_{ik} > 0$, for $i=1, \ldots, N_t$, $k=1, \ldots, N_s$, the KKT conditions are both necessary and sufficient conditions for optimality. Therefore, the solution in equation 19 is optimal for the problem represented by equation 17. This result is thus proven by noting the equivalence between the solution in equation 19 and equation 16 and by noting that an optimal solution to the problem represented by equation 17 is also an optimal solution to the problem represented by equation 14.

An iterative algorithm to find an optimal solution for multi-stream beamforming is illustrated in Table 2 below.

TABLE 2

Optimal Multi-Stream Tx Beamforming

1. Initialize V to a complex matrix such that $\|v_{ik}\|^2 = p_{ik}$, $i = 1, \ldots, N_t$, $k = 1, \ldots, N_s$.
2. In the n-th iteration, update $v_{ik}$ sequentially as follows:
   For $(k = 1, \ldots, N_s$, Calculate $G^k = F - \frac{1}{\sigma^2} F \overline{V}_k C_k^{-1} \overline{V}_k^\dagger F$.

For $(i = 1 \ldots, N_t, v_{ik} = \psi(\Sigma_{j \neq i} g_{ij}^k v_{jk}) \cdot \sqrt{p_{ik}}$
   ) End
   ) End
3. Check convergence. If yes, stop; if not, return to Step 2.

The iterative algorithm illustrated in Table 2 above converges to the optimal solution for the problem represented by equation 14. To show this, similar to the proof of the iterative algorithm outlined in Table 1, each update of $v_{ik}$ in the iteration maximizes the objective function given the power constraint on the i-th antenna for the k-th stream, assuming that the beamforming weights for all other antennas or other streams remain unchanged. As a result, the objective function is non-decreasing over the iterations. Since the objective function is bounded, the objective function converges to a certain limit.

When the mutual information converges, the condition $v_{ik} = \psi(\Sigma_{j \neq i} g_{ij}^k v_{jk}) \cdot \sqrt{p_{ik}}$ from equation 16 is satisfied for all $k=1, \ldots, N_s$, and $i=1, \ldots, N_t$. Based on the conditions associated with equation 16, the solution is optimal for the problem represented by equation 14.

Similar to the single-stream beamforming case, the formula for declaring convergence discussed above can be used as the stopping criteria for the iterations, and the mutual information gap discussed above can be used as a measure of convergence rate over iterations.

Various embodiments of the present disclosure provide optimal MIMO transmission schemes with per-antenna power constraints. The capacity-achieving MIMO transmission scheme for a single-user MIMO system with a total power constraint can be easily identified. The preset disclosure provides optimal MIMO transmission schemes in the single-user MIMO system with per-antenna power constraints. The optimal MIMO transmission scheme that maximizes the mutual information while satisfying the per-antenna power constraints can be formulated according to equation 20 below:

$$V^{opt} = \max_V \log\left|I_{N_s} + \frac{1}{\sigma^2}V^\dagger H^\dagger HV\right| \text{ s.t.} \quad \text{(Equation 20)}$$

$$\sum_{k=1}^{N_s} v_{ik} v_{ik}^* = p_i, i=1, \ldots, N_t$$

where $V=[v_1\ v_2\ \ldots\ v_{N_s}]$ is the MIMO precoder with $v_{ik}$ being the precoding coefficient on the i-th antenna for the k-th MIMO layer, and $p_i>0$, $i=1, \ldots, N_t$ are the per-antenna power constraints on the $N_t$ transmitter antennas 410. Although power allocation across antennas is prohibited, the power on one antenna can still be allocated among different MIMO layers on that antenna, as long as the per-antenna power constraint on that antenna is not violated.

Looking to the optimization on a per-antenna basis, the precoder on the i-th antenna can be defined according to equation 21 below:

$$u_i = [v_{i1} v_{i2} \ldots v_{iN_s}]^\dagger \quad \text{(Equation 21)}$$

where $u_i$ represents the transmission from the i-th antenna by all the MIMO layers. The MIMO precoder can therefore be alternatively represented according to equation 22 below:

$$U = V^\dagger = [u_1 u_2 \ldots u_{N_t}] \quad \text{(Equation 22).}$$

With $F=H^\dagger H$, without loss of generality, assuming $f_{ii}=\sum_{k=1}^{N_r}|h_{ki}|^2>0$, $i=1, 2, \ldots, N_t$, the optimization problem represented by equation 20 can be alternatively represented as another non-linear programming problem according to equation 23 below:

$$U^{opt} = \max_U \log\left|I_{N_s} + \frac{1}{\sigma^2}UFU^\dagger\right| \text{ s.t.} \quad \text{(Equation 23)}$$

$$g_i(U) = u_i^\dagger u_i - p_i = 0, i=1, \ldots, N_t.$$

In the next steps, the contribution of the transmission from the i-th antenna to the mutual information is identified. For the i-th antenna, a permutation of F is according to equation 24 below:

$$F_i = \begin{bmatrix} f_{ii} & q_i^\dagger \\ q_i & Q_i \end{bmatrix} \quad \text{(Equation 24)}$$

where $Q_i$ is the $(N_t-1)\times(N_t-1)$ matrix obtained by removing the i-th row and the i-th column from F, and $q_i$ is the i-th column of F without the diagonal item $f_{ii}$. Accordingly, defining $\overline{U}_i$ as the sub-matrix of U with $u_i$ removed, defining $w_i$ according to equation 25 below:

$$w_i = \overline{U}_i q_i / f_{ii} \quad \text{(Equation 25)}$$

and defining $D_i$ according to equation 26 below:

$$D_i = I + \frac{1}{\sigma^2}\overline{U}_i Q_i \overline{U}_i^\dagger - \frac{f_{ii}}{\sigma^2} w_i w_i^\dagger, \quad \text{(Equation 26)}$$

the contribution of the transmission from the i-th antenna to the mutual information can be separated from the contribution of other antennas according to equation 27 below:

$$f(U) = \log\left|I + \frac{1}{\sigma^2}UFU^\dagger\right| = \quad \text{(Equation 27)}$$

$$\log\left|I + \frac{1}{\sigma^2}[u_i\ \overline{U}_i]\begin{bmatrix} f_{ii} & q_i^\dagger \\ q_i & Q_i \end{bmatrix}\begin{bmatrix} u_i^\dagger \\ \overline{U}_i^\dagger \end{bmatrix}\right| = \log\left|I + \right.$$

$$U_i Q_i U_i^\dagger + f_{ii} u_i w_i^\dagger + w_i u_i^\dagger + u_i u_i^\dagger \sigma^2 =$$

$$\log D_i + f_{ii}\sigma^2 u_i + w_i u_i + w_i^\dagger =$$

$$\log D_i + \log 1 + f_{ii}\sigma^2 u_i + w_i^\dagger D_i - 1 u_i + w_i.$$

From equation 27, $D_i$ is invertible by setting $u_i=-w_i$ and by the fact that mutual information is always non-negative. Also from equation 27, the contribution of the i-th antenna to the mutual information given the interference from all other antennas can be represented according to equation 28 below:

$$f(u_i \mid \overline{U}_i, F) = \log\left[1 + \frac{f_{ii}}{\sigma^2}(u_i + w_i)^\dagger D_i^{-1}(u_i + w_i)\right]. \quad \text{(Equation 28)}$$

The objective function of the problem represented by equation 23 is real, but the variables are complex. KKT conditions do not exist for the problem represented by equation 23, because the real objective function, when defined on complex variables, does not satisfy Cauchy-Riemann Equations and is thus not differentiable. In order to apply KKT conditions, the problem represented by equation 23 is converted into an equivalent optimization on real variables. For example, letting $X=\text{Re}\{U\}$, $Y=\text{Im}\{U\}$, and $$\tilde{f}(X, Y) = \log\left|I_{N_s} + \frac{(X+jY)F(X^T-jY^T)}{\sigma^2}\right| = \log\left|I + \frac{1}{\sigma^2}UFU^\dagger\right| = f(U),$$

then the problem represented by equation 23 is equivalent to the following problem defined on real variables X and Y according to equation 29 below:

$$(X^{opt}, Y^{opt}) = \arg\max_{X,Y} \tilde{f}(X,Y)$$

$$\tilde{g}_i(X,Y) = \sum_{k=1}^{N_s}(x_{ik}^2 + y_{ik}^2) - p_i = 0, \text{ for } i=1, \ldots, N_t \quad \text{(Equation 29).}$$

A convex optimization problem is further defined by relaxing the equality power constraints to inequality according to equation 30 below:

$$(X^{opt}, Y^{opt}) = \arg\max_{X,Y} \tilde{f}(X,Y)$$

$$\tilde{g}_i(X,Y) = \sum_{k=1}^{N_s}(x_{ik}^2 + y_{ik}^2) - p_i \leq 0, \text{ for } i=1, \ldots, N_t \quad \text{(Equation 30).}$$

It is easy to verify that both the objective function and the region of the problem represented by equation 30 are convex. The optimal solution of the convex programming problem represented by equation 30 is also the optimal solution of the original problem represented by equation 20, (i.e., the solution to the convex programming problem represented by equation 30 is also a solution to the problem represented by equation 20 with the mapping U=X+jY and U=V†). To show this, it is easy to see that the problem represented by equations 20, 23 and 29 are equivalent with the mapping U=V† and U=X+jY. This leaves the need to prove the solution to the problem represented by equation 30 is also a solution to the problem represented by equation 29. The problem represented by equation 30 becomes equivalent to the problem represented by equation 29 if all the per-antenna power constraints in the problem represented by equation 30 are binding (i.e., satisfied with equality).

By contradiction, it can be proven that a solution to the problem represented by equation 30 must satisfy all the per-antenna power constraints with equality. For example, assume X and Y are the solution to the problem represented by equation 30 and the per-antenna power constraint on the i-th antenna is not binding (i.e., $\Sigma_{k=1}^{N_s}(x_{ik}^2+y_{ik}^2)-p_i=u_i^\dagger u_i-p_i<0$). Therefore, there exists $\epsilon>0$, such that $[u_i+\epsilon(u_i+w_i)]^\dagger[u_i+\epsilon(u_i+w_i)]<p_i$. If the i-th column in U is replaced by $u_i+\epsilon(u_i+w_i)$ and the corresponding real variables are denoted as $\tilde{X}$ and $\tilde{Y}$, all the per-antenna element power constraints are still satisfied by $\tilde{X}$ and $\tilde{Y}$, and the value of the objective function will be $$\tilde{f}(\tilde{X},\tilde{Y}) = \log|D_i| + \log\left[1 + \frac{(1+\epsilon)^2 f_{ii}}{\sigma^2}(u_i+w_i)^\dagger D_i^{-1}(u_i+w_i)\right] >$$

$$\log|D_i| + \log\left[1 + \frac{f_{ii}}{\sigma^2}(u_i+w_i)^\dagger D_i^{-1}(u_i+w_i)\right] = \tilde{f}(X,Y).$$

This contradicts with the assumption that X and Y are a solution to the problem represented by equation 30. Therefore, any solution to the problem represented by equation 30 must satisfy all per-antenna power constraints with equality. In this example, this solution is also a solution to the problem represented by equation 29, which is equivalent to the problem represented by equation 20.

As a result, the problem represented by equation 30 can be solved instead of the problem represented by equation 20 to find the optimal solution for the problem represented by equation 20. The problem represented by equation 30 is a convex programming problem defined on real variables, and thus, KKT conditions are applicable.

Before finding the optimal solution of the problems represented by equations 20 and 30, the present disclosure first addresses the optimal solution for $f(u_i|\bar{U}_i,F)$. From equation 28, $u_i$ should be chosen to maximize $f(u_i|\bar{U}_i,F)$ in order to maximize $f(U)$ according to equation 31 below:

$u_i^{opt}=\arg\max_{u_i}(u_i+w_i)^\dagger D_i^{-1}(u_i+w_i) s.t.$ $u_i^\dagger u_i=p_i$ (Equation 31).

Similar to showing that the solution to the convex programming problem represented by equation 30 is also a solution to the problem represented by equation 20 with the mapping U=X+jY and U=V†, the solution to the problem represented by equation 31 coincides with the solution to an alternative problem with the equality constraint relaxed to inequality. In other words, the precoder on the i-th antenna should be chosen according to the following optimization problem according to equation 32 below:

$u_i^{opt}=\arg\max_{u_i}(u_i+w_i)^\dagger D_i^{-1}(u_i+w_i) s.t.$ $u_i^\dagger u_i \leq p_i$ (Equation 32).

The problem represented by equation 32 is a convex programming problem. Intuitively, the objective is to maximize a quadratic function $(u_i+w_i)^\dagger D_i^{-1}(u_i+w_i)$ within a sphere defined by $u_i^\dagger u_i \leq p_i$. The center (global minimum) of the quadratic function is at $-w_i$, while the center of the sphere is at origin. By denoting the SVD of $D_i$ according to equation 33 below:

$D_i=Z_i\Gamma_i^2 Z_i^\dagger$ (Equation 33)

with $Z_i^\dagger Z_i=Z_i Z_i^\dagger=I$, $\tilde{u}_i=Z_i^\dagger u_i$ and $\tilde{w}_i=Z_i^\dagger w_i$, the optimization problem represented by equation 32 can be transformed according to equation 34 below:

$\tilde{u}_i^{opt}=\arg\max_{\tilde{u}_i}(\tilde{u}_i+\tilde{w}_i)^\dagger \Gamma_i^{-2}(\tilde{u}_i+\tilde{w}_i) s.t.$ $\tilde{u}_i^\dagger \tilde{u}_i \leq p_i$ (Equation 34).

In order to maximize the objective function, it is apparent that the two complex numbers, $\tilde{u}_{ki}^{opt}$ and $\tilde{w}_{ki}$ should be in-phase for any MIMO layer $k=1, \ldots, N_s$. With that, the problem degenerates to power allocation among the $N_s$ MIMO layers at the i-th antenna. Denoting the amplitude of $\tilde{u}_{ki}$ by $\alpha_{ki}$, the amplitude of $\tilde{w}_{ki}$ by $\beta_{ki}$ and letting $\alpha_i=[\alpha_{1i}\ \alpha_{2i}\ \ldots\ \alpha_{N_s i}]$, and $\beta_i=[\beta_{1i}\ \beta_{2i}\ \ldots\ \beta_{N_s i}]$, then the optimization problem represented by equation 34 can be further simplified according to equation 35 below:

$$\alpha_i^{opt} = \arg\max_{\alpha_i} \sum_{k=1}^{N_s} \frac{(\alpha_{ki}+\beta_{ki})^2}{\gamma_{ki}^2} \text{ s.t.}$$ (Equation 35)

$$\sum_{k=1}^{N_s} \alpha_{ki}^2 \leq p_i.$$

The contours of the objective function in the problem represented by equation 35 are $N_s$-dimension ellipsoids centered at $-\beta_k$. The constraints in the problem represented by equation define an $N_s$-dimension sphere centered at origin. The optimization problem is equivalent to finding the ellipsoidal contour with the highest objective function value that is tangent to the $N_s$-dimension sphere. The tangent point is exactly the optimal solution to the problem represented by equation 35.

Figure 6:
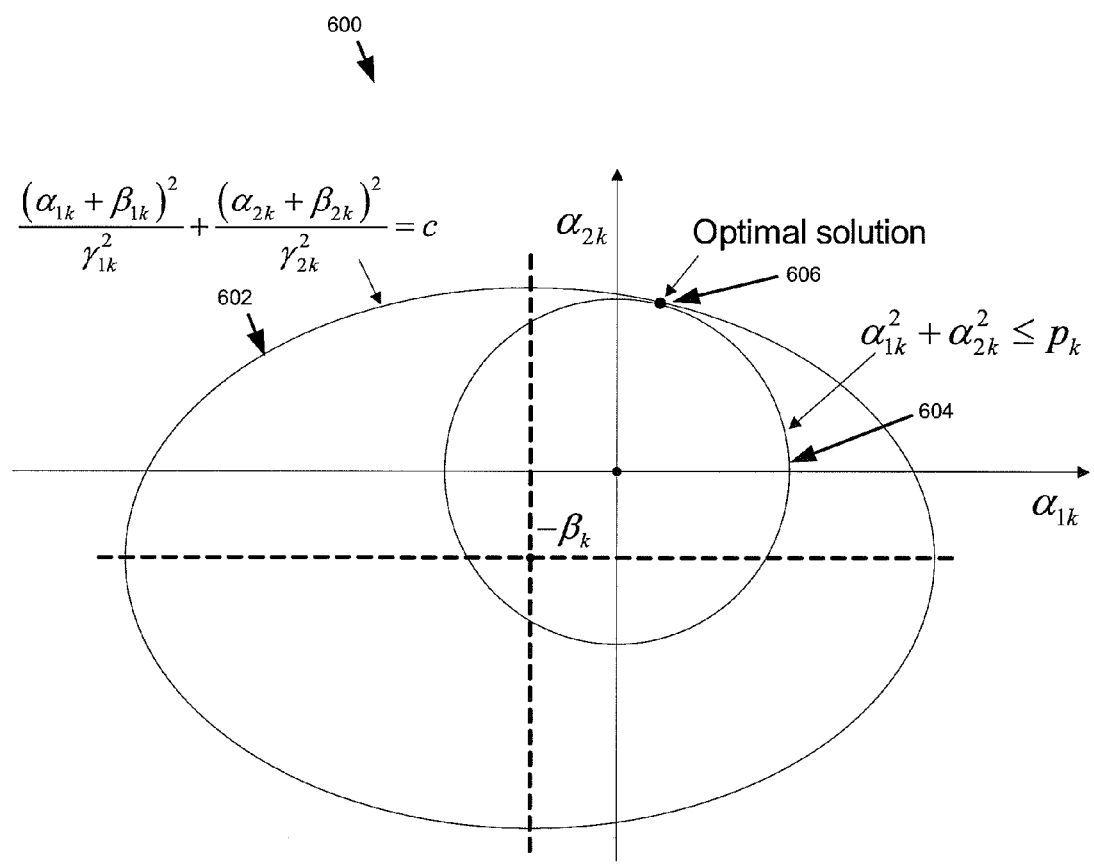
FIG. 6 illustrates a plot of a graph illustrating calculation of a solution for multiple antenna transmission with per-antenna power constraints.

FIG. 6 illustrates a plot of a graph 600 illustrating calculation of a solution for multiple antenna transmission with per-antenna power constraints. FIG. 6 illustrates an example when $N_s=2$. This optimal solution can be pictorially illustrated as drawing an ellipse 602 centered at $(-\beta_{1k}, -\beta_{2k})$ that is tangent to a circle 604 centered at origin as in FIG. 6. The optimal solution is the tangential point 606 between the elliptical contour 602 that corresponds to the highest possible objective function value and the circle 604 that represents the per-antenna power constraint.

This optimization problem can be easily solved by the method of Lagrange multiplier. It can be shown that the optimal solution to the problem defined by equation 35 should satisfy the following KKT condition according to equation 36 below:

$(\rho_i^{opt}\Gamma_i^2-I)\alpha_i^{opt}=\beta_i$ (Equation 36)

where $\rho_i^{opt}>0$ is the Lagrange multiplier chosen such that the power constraint on the i-th antenna is binding, (i.e., $\alpha_i^\dagger \alpha_i=p_i$). The value of $\rho_i^{opt}$ can be found by solving the following equation derived from equation 36 and the binding power constraint according to equation 37 below:

$$\sum_{k=1}^{N_s} \frac{\beta_{ki}^2}{(\rho_i^{opt} \gamma_{ki}^2 - 1)^2} = p_i. \quad \text{(Equation 37)}$$

Letting $q(\rho_i)$ be a function of $\rho_i$ $$\left( \text{i.e., } q(p_i) = \sum_{k=1}^{N_s} \frac{\beta_{ki}^2}{(p_i \gamma_{ki}^2 - 1)^2} - p_i \right)$$

then, $\rho_i^{opt}$ is a root to the equation $q(\rho_i)=0$. From equation 37, can be seen that:

$$\frac{\beta_{ki}^2}{(\rho_i^{opt} \gamma_{ki}^2 - 1)^2} - p_i \leq 0, \quad \text{(Equation 38)}$$

for $k = 1, \ldots, N_s$.

A lower bound of $\rho_i^{opt}$ can, therefore, be obtained according to equation 39 below:

$$\rho_i^{opt} \geq \max_k \frac{1}{\gamma_{ki}^2} \left( 1 + \sqrt{\frac{\beta_{ki}^2}{p_i}} \right) = \rho_i^{min} \quad \text{(Equation 39)}$$

In addition, $\rho_i^{opt}$ is unique, since the $q(\rho_i)$ is a monotonically decreasing function in $[\rho_i^{min}, +\infty)$. As a result, a simple Newton's method function can be used to find the value of $\rho_i^{opt}$. The iterative update of the Newton's method is according to equation 40 below:

$$\rho_i(n+1) = \rho_i(n) - \frac{q(\rho_i(n))}{q'(\rho_i(n))} \quad \text{(Equation 40)}$$

where the derivative $q'(\rho_i)$ is given according to equation 41 below:

$$q'(\rho_i) = \sum_{k=1}^{N_s} \frac{-2\beta_{ki}^2 \gamma_{ki}^2}{(p_i \gamma_{ki}^2 - 1)^3}. \quad \text{(Equation 41)}$$

The iterative algorithm can be initialized by $\rho_i(0)=\rho_i^{min}$. To reduce the complexity of numerical solutions for $\rho_i^{opt}$, an upper bound can also be given as $$\sum_{k=1}^{N_s} \frac{\beta_{ki}^2}{(\rho_i^{opt} \gamma_{li}^2 - 1)^3} \geq \sum_{k=1}^{N_s} \frac{\beta_{ki}^2}{(\rho_i^{opt} \gamma_{ki}^2 - 1)^2} = p_i$$

where the index l corresponds to the smallest $\gamma_{ki}^2$ (i.e., l=arg $\min_k \gamma_{ki}^2$ (Equation 42)). This results in the following solution according to equation 43 below:

$$\rho_i^{opt} \leq \gamma_{li}^2 \left( 1 + \sqrt{\frac{\sum_{k=1}^{N_s} \beta_{ki}^2}{p_i}} \right) = \rho_i^{max}. \quad \text{(Equation 43)}$$

In other words, the numerical solution can be limited in the region of $\rho_i^{min} \leq \rho_i^{opt} \leq \rho_i^{max}$ (Equation 44) where $\rho_i^{min}$ and $\rho_i^{max}$ are defined in equations 39 and 43, respectively. This allows a simple bisection method (i.e., a binary search) to find $\rho_i^{opt}$ if so preferred over the Newton's method. The iterative update of the bisection method is given according to equation 45 below:

$$\rho_i(n+1) = \frac{1}{2}[\rho_i^{LB}(n) + \rho_i^{UB}(n)] \quad \text{(Equation 45)}$$

$$\rho_i^{LB}(n+1) = \begin{cases} \rho_i^{LB}(n), & \text{if } \rho_i(n+1) < 0 \\ \rho_i(n+1), & \text{otherwise} \end{cases}$$

$$\rho_i^{UB}(n+1) = \begin{cases} \rho_i^{UB}(n), & \text{if } \rho_i(n+1) > 0 \\ \rho_i(n+1), & \text{otherwise.} \end{cases}$$

The algorithm can be initialized by setting $\rho_i^{LB}(0)=\rho_i^{min}$, and $\rho_i^{UB}(0)=\rho_i^{max}$. The convergence of these numerical methods is also guaranteed. The second order derivative of $q(\rho_i)$ is always positive on $[\rho_i^{min}, +\infty)$ (i.e., $$q''(\rho_i) = \sum_{k=1}^{N_s} \frac{6\beta_{ki}^2 \gamma_{ki}^4}{(\rho_i \gamma_{ki}^2 - 1)^4} > 0, \quad \text{(Equation 46))}$$

for $\rho_i \geq \rho_i^{min}$.

Therefore, $q(\rho_i)$ is convex on $[\rho_i^{min}, +\infty)$. Additionally, $q(\rho_i)$ is monotonically decreasing) on $[\rho_i^{min}, +\infty)$, $q(\rho_i^{min}) \geq 0$, and $q(\rho_i^{max}) \leq 0$. It is then straightforward to prove that the equation $q(\rho_i)=0$ has a unique root on $[\rho_i^{min}, +\infty)$, and both the Newton's method and the bisection method are guaranteed to converge to the unique solution.

With the solution for the optimization problem represented by equation 35 found numerically, the optimal solution for the problems represented by equations 34, 32 and 31 is also found. From equation 36, and the fact that $\tilde{u}_{ki}^{opt}$ and $\tilde{w}_{ki}$ should be in-phase for any MIMO layer $k=1, \ldots, N_s$, the optimal solution for the problem represented by equation 34 is also found according to equation 46 below:

$$\tilde{u}_i^{opt} = (\rho_i^{opt} \Gamma_i^2 - I)^{-1} \tilde{w}_i \quad \text{(Equation 46).}$$

Because $\tilde{u}_i = Z_i^\dagger u_i$, and $\tilde{w}_i = Z_i^\dagger w_i$, the optimal solution for the problems represented by equations 32 and 32 are readily obtained according to equation 47 below:

$$u_i = Z_i (\rho_i^{opt} \Gamma_i^2 - I)^{-1} Z_i^\dagger w_i \quad \text{(Equation 47).}$$

In other words, given the transmission signals from all other antennas, the optimal transmission scheme from the i-th antenna can be identified. With this knowledge, the optimal solution for the problem represented by equation 30 can be solved. Using equations 27 and 47, the KKT conditions of the problem represented by equation 30 can be represented according to equation 48 below:

$$u_i = Z_i (\rho_i^{opt} \Gamma_i^2 - I)^{-1} Z_i^\dagger w_i, \ i=1, \ldots, N_t \quad \text{(Equation 48)}$$

where $w_i$ and $D_i$ are defined in equations 25 and 26, respectively, $Z_i$ and $\Gamma_i$ are defined in equation 33, and $\rho_i^{opt}$ is the Lagrange multiplier for the problem represented by equation 35 that can be found numerically. Although the optimization variables in the problem represented by equation 30 are $x_{ki}$ and $y_{ki}$, the KKT conditions in equation 48 are described in terms of $u_i$ for simplicity because of the mapping $U=X+jY$. Because the problem represented by equation 30 is convex and satisfies Slater condition, the KKT conditions in equation 48 are both necessary and sufficient for optimality.

Based on equation 48, the present disclosure provides an iterative algorithm to find the optimal solution. The iterative algorithm is described in Table 3 below.

TABLE 3

Optimal MIMO transmission with per-antenna power constraints

1. Initialize U to a complex matrix such that $\Sigma_{k=1}^{N_s}\|u_{ki}\|^2 = p_i$, $i = 1, \ldots, N_t$.
2. In the n-th iteration, update $u_i$ sequentially as follows:
   For ($i = 1 \ldots, N_t$,
      Calculate $w_i$, $D_i$, $Z_i$, and $\Gamma_i$ as in equations 25, 26, and 33.
      Solve for the problem represented by equation 35 numerically using either the Newton's method as described in equation 40 or the bisection method as described in equation 45.
      Update $u_i$ using equation 47 with $\rho_i^{opt}$ being the Lagrange multiplier for the problem represented by equation 35.
   ) End
3. Check convergence. If yes, stop; if not, return to Step 2.

The iterative algorithm illustrated in Table 3 converges to an optimal solution for the problem represented by equation 20. For example, in the update for the i-th antenna in each iteration, $u_i$ is updated such that the contribution to mutual information from the i-th antenna is maximized, without reducing the mutual information contribution from all other antennas. As a result, the mutual information does not decrease through the iterations. In addition, the mutual information is bounded. As a result, the objective function will converge to a certain limit. When the objective function stops increasing, the condition $u_i = Z_i(\rho_i^{opt}T_i^2 - I)^{-1}Z_i^\dagger w_i$ is met by all antennas $i=1, \ldots, N_t$. Therefore, the KKT conditions are met, and the solution is optimal.

For practical purposes, since maximizing the achievable mutual information is desirable, the change rate of the mutual information across iterations can be used as an indication of convergence. For example, denote the achieved mutual information after the n-th iterations as $$f(n) = \log\left|I_{N_s} + \frac{1}{\sigma^2}U(n)FU^\dagger(n)\right|.$$

Convergence of the algorithm can be determined according to equation 49 if $$\frac{f(n) - f(n-1)}{f(n)} < \varepsilon. \quad \text{(Equation 49)}$$

The convergence criteria should only be applied between iterations, not between the updates for different antenna elements within an iteration, as it is possible that convergence has not been reached although the update for a single antenna element does not increase the objective function. To evaluate how fast the algorithm converges, the Mutual Information Gap for the n-th iteration can be defined according to equation 50 below:

$$\tau(n) = \frac{f(\infty) - f(n)}{f(\infty)}. \quad \text{(Equation 50)}$$

where $f(\infty)$ denotes the maximum achievable mutual information given the element-wise power constraints.

Figure 7:
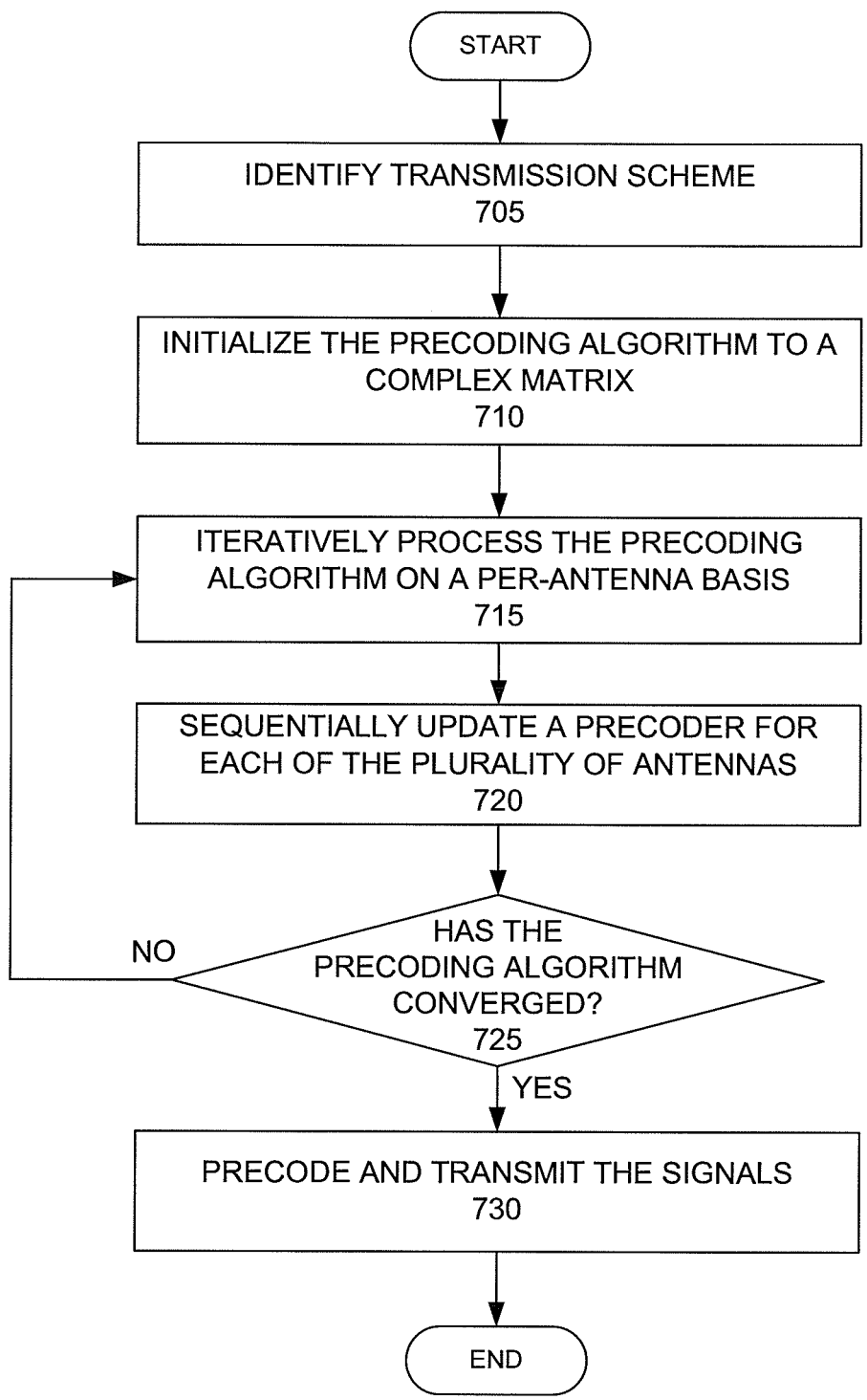
FIG. 7 illustrates a process for transmitting signals using multiple antennas that takes into account per-antenna power constraints in accordance with various embodiments of the present disclosure.

FIG. 7 illustrates a process for transmitting signals using multiple antennas that takes into account per-antenna power constraints in accordance with various embodiments of the present disclosure. For example, the process depicted in FIG. 7 may be performed by the controller 412 and the transmitter 402 in FIG. 4. The process may be used in transmitting in uplink or downlink communication. For example, the transmitter 402 may be located in a base station, relay station or user equipment.

The process begins by identifying a transmission scheme to use in transmitting the signals (step 705). For example, in step 705, the process may determine whether a single or multiple streams of data need to be transmitted. For single stream transmission, the process may select the algorithm described in Table 1. For multiple stream transmission, the process may select the algorithm described in Table 2. For optimal MIMO transmission with per-antenna power constraints, the process may select the algorithm described in Table 3.

The process then initializes the precoding algorithm to a complex matrix (step 710). Thereafter, the process iteratively processes the precoding algorithm on a per-antenna basis (step 715). The process then sequentially updates a precoder for each of the plurality of antennas (step 720). For example, in step 720, the process updates the precoder for each antenna in one iteration.

Thereafter, the process determines whether the precoding algorithm has converged (step 725). For example, in step 725, the process may determine whether the precoding algorithm converged based on a change in a rate of mutual information across iterations as described in equation 49 above.

If the process determines that the precoding algorithm has not converged, the process returns to step 715 and continues to iteratively process the precoding algorithm on the per-antenna basis. For example, the process proceeds to a next iteration of sequentially updating the precoder for each antenna. If the process determines that the precoding algorithm has converged, the process then precodes and transmits the signals (step 730), with the process terminating thereafter.

The present disclosure provides the necessary and sufficient conditions for optimal single-stream transmitter beamforming, multi-stream transmitter beamforming, and optimal MIMO transmission with per-antenna power constraints. The present disclosure also provides iterative algorithms to achieve the optimal single-stream beamforming, multi-stream beamforming, and MIMO transmission solutions with per-antenna power constraints. The present disclosure shows that these algorithms converge to the optimal solutions. These algorithms are generally applicable to MIMO and beamforming with any per-antenna power constraints and make no assumption on the channel. Simulation studies show that the optimal beamforming and transmission schemes with per-antenna power constraints achieve mutual information close to the channel capacity without the per-antenna power constraints. On average, the iterative algorithm achieves more than 99% of the maximum achievable mutual information after 3 iterations.

Although the present disclosure has been described with an exemplary embodiment, various changes and modifications may be suggested to one skilled in the art. It is intended that the present disclosure encompass such changes and modifications as fall within the scope of the appended claims.

What is claimed is:

1. A method for transmitting signals in a wireless communication system, the method comprising:
   identifying a number of streams to be transmitted;
   identifying a precoding algorithm based on whether a single stream or multiple streams are to be transmitted;
   initializing the precoding algorithm to a complex matrix, the precoding algorithm for precoding signals transmitted by a plurality of antennas;
   iteratively processing the precoding algorithm on a per-antenna basis by, at each iteration, sequentially updating a precoder for each of the plurality of antennas;
   after each iteration, determining whether the precoding algorithm has converged based on a change in a rate of mutual information across iterations; and
   in response to determining that the precoding algorithm converged, transmitting the signals using the precoding algorithm,
   wherein sequentially updating the precoder comprises:
   (i) in response to identifying that a single stream is to be transmitted, sequentially updating the precoder ($v_i$) of an i-th antenna according to:

$$v_i = \psi\left(\sum_{k \neq i} f_{ik} v_k\right) \cdot \sqrt{p_i}$$

where $\psi(w)$ represents a phase of a complex variable w, where $f_{ki}$ is an element of F at a k-th row and an i-th column, F is a matrix obtained by multiplying the complex matrix by a conjugate transpose of the complex matrix on the left, $v_k$ is a precoder at the k-th antenna, and $p_i$ is a power constraint on the i-th antenna; or
   (ii) in response to identifying that multiple streams are to be transmitted, sequentially updating the precoder ($v_{ik}$) of an i-th antenna and a k-th stream according to:

$$v_{ik} = \psi\left(\sum_{j \neq i} g_{ij}^k v_{jk}\right) \cdot \sqrt{p_{ik}}$$

where $\psi(w)$ represents a phase of a complex variable w, $g_{ij}^k$ is the (i, j)-th entry of $G^k$ with $G^k$ being a matrix derived from the channel matrix and a current value of the precoder, $v_{jk}$ is a current value of the precoder at a j-th antenna and a k-th stream, and $p_{ik}$ is a power constraint on the k-th stream and the i-th antenna.

2. The method of claim 1 further comprising:
   in response to determining that the precoding algorithm has not converged, continuing to iteratively process the precoding algorithm on the per-antenna basis at a next iteration.

3. The method of claim 1, wherein sequentially updating the precoder of each of the plurality of antennas comprises:
   sequentially updating the precoder ($u_i$) of an i-th antenna according to:

$u_i = Z_i(\rho_i^{opt}\Gamma_i^2 - I)^{-1}Z_i^\dagger w_i$ where $Z_i$ is a unitary matrix with columns being singular vectors of $D_i$, where $\rho_i^{opt}$ is a scalar, where $\Gamma_i^2$ is a diagonal matrix with diagonal entries being singular values of $D_i$, where I is an identity matrix, where $Z_i^\dagger$ is a conjugate transpose of $Z_i$, where $w_i$ is a complex vector for the i-th antenna, and where $D_i$ is a positive semi-definite matrix derived based on the channel matrix and a current value of the precoder.

4. The method of claim 3, wherein initializing the precoding algorithm comprises initializing the precoding algorithm to the complex matrix such that $\sum_{k=1}^{N_s}\|u_{ki}\|^2 = p_i$, where $N_s$ is a number of streams to be transmitted, $u_{ki}$ is a precoder for a k-th stream and the i-th antenna, and $p_i$ is a power constraint on the i-th antenna.

5. The method of claim 1, wherein, for an identification that a single stream is to be transmitted, initializing the precoding algorithm comprises initializing the precoding algorithm to the complex matrix such that $\|v_i\|^2 = p_i$.

6. The method of claim 1, wherein, for an identification that multiple streams are to be transmitted, initializing the precoding algorithm comprises initializing the precoding algorithm to the complex matrix such that $\|v_{ik}\|^2 = p_{ik}$.

7. An apparatus configured to transmit signals in a wireless communication system, the apparatus comprising:
   a controller configured to identify a number of streams to be transmitted; identify a precoding algorithm based on whether a single stream or multiple streams are to be transmitted; initialize the precoding algorithm to a complex matrix, the precoding algorithm for precoding signals transmitted by a plurality of antennas; iteratively process the precoding algorithm on a per-antenna basis by, at each iteration, sequentially updating a precoder for each of the plurality of antennas; and after each iteration, determine whether the precoding algorithm has converged based on a change in a rate of mutual information across iterations;
   a precoding unit configured to, in response to a determination that the precoding algorithm converged, precode the signals using the precoding algorithm; and
   the plurality of antennas configured to transmit the precoded signals,
   wherein the controller is further configured to:
   (i) in response to identification that a single stream is to be transmitted, sequentially update the precoder ($v_i$) of an i-th antenna according to:

$$v_i = \psi\left(\sum_{k \neq i} f_{ik} v_k\right) \cdot \sqrt{p_i}$$

where $\psi(w)$ represents a phase of a complex variable w, where $f_{ki}$ is an element of F at a k-th row and an i-th column, F is a matrix obtained by multiplying the complex matrix by a conjugate transpose of the complex matrix on the left, $v_k$ is a precoder at the k-th antenna, and $p_i$ is a power constraint on the i-th antenna; or
   (ii) in response to identification that multiple streams are to be transmitted, sequentially update the precoder ($v_{ik}$) of an i-th antenna and a k-th stream according to:

$$v_{ik} = \psi\left(\sum_{j \neq i} g_{ij}^k v_{jk}\right) \cdot \sqrt{p_{ik}}$$

where $\psi(w)$ represents a phase of a complex variable w, $g_{ij}^k$ is the (i,j)-th entry of $G^k$ with $G^k$ being a matrix derived from the channel matrix and a current value of the precoder, $v_{jk}$ is a current value of the precoder at a j-th antenna and a k-th stream, and $p_{ik}$ is a power constraint on the k-th stream and the i-th antenna.

8. The apparatus of claim 7, wherein the controller is configured to, in response to determining that the precoding algorithm has not converged, continue to iteratively process the precoding algorithm on the per-antenna basis at a next iteration.

9. The apparatus of claim 7, wherein to sequentially update the precoder of each of the plurality of antennas, the controller is further configured to sequentially update the precoder ($u_i$) of an i-th antenna according to:

$$u_i = Z_i(\rho_i^{opt}\Gamma_i^2 - I)^{-1}Z_i^\dagger w_i$$

where $Z_i$ is a unitary matrix with columns being singular vectors of $D_i$, where $\rho_i^{opt}$ is a scalar, where $\Gamma_i^2$ is a diagonal matrix with diagonal entries being singular values of $D_i$, where I is an identity matrix, where $Z_i^\dagger$ is a conjugate transpose of $Z_i$, where $w_i$ is a complex vector for the i-th antenna, and where $D_i$ is a positive semi-definite matrix derived based on the channel matrix and a current value of the precoder.

10. The apparatus of claim 9, wherein to initialize the precoding algorithm, the controller is further configured to initialize the precoding algorithm to the complex matrix such that $\Sigma_{k=1}^{N_s}\|u_{ki}\|^2 = p_i$, where $N_s$ is a number of streams to be transmitted, $u_{ki}$ is a precoder for a k-th stream and the i-th antenna, and $p_i$ is a power constraint on the i-th antenna.

11. The apparatus of claim 7, wherein, for identification that a single stream is to be transmitted, to initialize the precoding algorithm, the controller is further configured to initialize the precoding algorithm to the complex matrix such that $\|v_i\|^2 = p_i$.

12. The apparatus of claim 7, wherein, for an identification that multiple streams are to be transmitted, to initialize the precoding algorithm, the controller is further configured to initialize the precoding algorithm to the complex matrix such that $\|v_{ik}\|^2 = p_{ik}$.

13. A system comprising the apparatus of claim 7 and a receiver configured to receive the transmitted signals.

14. An apparatus configured to transmit signals in a wireless communication system, the apparatus comprising:
a controller configured to:
identify a number of streams to be transmitted;
identify a precoding algorithm based on whether a single stream or multiple streams are to be transmitted;
initialize the precoding algorithm to a complex matrix, the precoding algorithm for precoding signals transmitted by a plurality of antennas;
iteratively process the precoding algorithm on a per-antenna basis by, at each iteration, sequentially updating a precoder for each of the plurality of antennas, wherein to sequentially update the precoder of each of the plurality of antennas, the controller is further configured to sequentially update the precoder ($u_i$) of an i-th antenna according to:

$$u_i = Z_i(\rho_i^{opt}\Gamma_i^2 - I)^{-1}Z_i^\dagger w_i$$

where $Z_i$ is a unitary matrix with columns being singular vectors of $D_i$, where $\rho_i^{opt}$ is a scalar, where $\Gamma_i^2$ is a diagonal matrix with diagonal entries being singular values of $D_i$, where I is an identity matrix, where $Z_i^\dagger$ is a conjugate transpose of $Z_i$, where $w_i$ is a complex vector for the i-th antenna, and where $D_i$ is a positive semi-definite matrix derived based on the channel matrix and a current value of the precoder;
after each iteration, determine whether the precoding algorithm has converged based on a change in a rate of mutual information across iterations; and
a precoding unit configured to, in response to a determination that the precoding algorithm converged, precode the signals using the precoding algorithm; and
the plurality of antennas configured to transmit the precoded signals.

15. The apparatus of claim 14, wherein the controller is configured to, in response to determining that the precoding algorithm has not converged, continue to iteratively process the precoding algorithm on the per-antenna basis at a next iteration.

16. The apparatus of claim 14, wherein to initialize the precoding algorithm, the controller is further configured to initialize the precoding algorithm to the complex matrix such that $\Sigma_{k=1}^{N_s}\|u_{ki}\|^2 = p_i$, where $N_s$ is a number of streams to be transmitted, $U_{ki}$ is a precoder for a k-th stream and the i-th antenna, and $p_i$ is a power constraint on the i-th antenna.

17. A system comprising the apparatus of claim 14 and a receiver configured to receive the transmitted signals.

18. A method for transmitting signals in a wireless communication system, the method comprising:
identifying a number of streams to be transmitted;
identifying a precoding algorithm based on whether a single stream or multiple streams are to be transmitted;
initializing the precoding algorithm to a complex matrix, the precoding algorithm for precoding signals transmitted by a plurality of antennas;
iteratively processing the precoding algorithm on a per-antenna basis by, at each iteration, sequentially updating a precoder for each of the plurality of antennas, sequentially updating the precoder of each of the plurality of antennas comprises sequentially updating the precoder ($u_i$) of an i-th antenna according to:

$$u_i = Z_i(\rho_i^{opt}\Gamma_i^2 - I)^{-1}Z_i^\dagger w_i$$

where $Z_i$ is a unitary matrix with columns being singular vectors of $D_i$, where $\rho_i^{opt}$ is a scalar, where $\Gamma_i^2$ a diagonal matrix with diagonal entries being singular values of $D_i$, where I is an identity matrix, where $Z^\dagger_i$ is a conjugate transpose of $Z_i$, where $w_i$ is a complex vector for the i-th antenna, and where $D_i$ is a positive semi-definite matrix derived based on the channel matrix and a current value of the precoder;
after each iteration, determining whether the precoding algorithm has converged based on a change in a rate of mutual information across iterations; and
in response to determining that the precoding algorithm converged, transmitting the signals using the precoding algorithm.

19. The method of claim 18 further comprising:
in response to determining that the precoding algorithm has not converged, continuing to iteratively process the precoding algorithm on the per-antenna basis at a next iteration.

20. The method of claim 18, wherein initializing the precoding algorithm comprises initializing the precoding algorithm to the complex matrix such that $\Sigma_{k=1}^{N_s}\|u_{ki}\|^2 = p_i$, where $N_S$ is a number of streams to be transmitted, $u_{ki}$ is a precoder for a k-th stream and the i-th antenna, and $p_i$ is a power constraint on the i-th antenna.

* * * * *